United States Patent
Nobori et al.

(10) Patent No.: US 7,903,156 B2
(45) Date of Patent: Mar. 8, 2011

(54) IMAGE PROCESSING DEVICE, IMAGE PROCESSING METHOD, COMPUTER PROGRAM, RECORDING MEDIUM STORING THE COMPUTER PROGRAM, FRAME-TO-FRAME MOTION COMPUTING METHOD, AND IMAGE PROCESSING METHOD

(75) Inventors: Kunio Nobori, Osaka (JP); Takeo Azuma, Kyoto (JP); Hideto Motomura, Kyoto (JP); Taro Imagawa, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 12/600,390

(22) PCT Filed: May 13, 2008

(86) PCT No.: PCT/JP2008/001196
§ 371 (c)(1),
(2), (4) Date: Nov. 16, 2009

(87) PCT Pub. No.: WO2009/011082
PCT Pub. Date: Jan. 22, 2009

(65) Prior Publication Data
US 2010/0157149 A1    Jun. 24, 2010

(30) Foreign Application Priority Data

Jul. 17, 2007   (JP) .............................. 2007-186049
Feb. 19, 2008   (JP) .............................. 2008-037961

(51) Int. Cl.
H04N 9/04    (2006.01)
H04N 5/225   (2006.01)
H04N 5/228   (2006.01)

(52) U.S. Cl. .................... 348/272; 348/220.1; 348/222.1

(58) Field of Classification Search .................. 348/265, 348/267, 271–273, 277–279, 208.99, 208.13, 348/220.1, 222.1
See application file for complete search history.

(56) References Cited

U.S. PATENT DOCUMENTS
5,436,661 A * 7/1995 Yamamoto et al. ........... 348/264
(Continued)

FOREIGN PATENT DOCUMENTS
JP     07-203318    8/1995
(Continued)

OTHER PUBLICATIONS
International Search Report for corresponding application No. PCT/JP2008/001196 dated Jul. 23, 2008.
(Continued)

Primary Examiner — David L Ometz
Assistant Examiner — Ahmed A Berhan
(74) Attorney, Agent, or Firm — Renner, Otto, Boisselle & Sklar, LLP

(57) ABSTRACT

An image processing apparatus and method is provided to generate a moving picture with a high resolution, a high frame rate and a high SNR by eliminating a decrease in SNR even if the intensity of incoming light has been halved by a half mirror. The apparatus generates a multi-color moving picture based on first and second moving pictures, which respectively have first and second frame rates (where the second rate is higher than the first rate) and are comprised of pictures representing a first color component and pictures representing a second color component different from the first color component. The resolution of the second moving picture is equal to or lower than that of the first moving picture. The apparatus includes: a first image synthesizing section, which generates, based on the data of the first and second moving pictures, a synthetic picture by modifying some of the pictures that form the first moving picture and which outputs a synthesized moving picture corresponding to the first moving picture at a higher frame rate than the first frame rate by using the first moving picture and the synthetic picture; and a second image synthesizing section, which receives and synthesizes together the synthesized moving picture and the second moving picture, thereby generating a multi-color moving picture including the first and second color components.

29 Claims, 18 Drawing Sheets

U.S. PATENT DOCUMENTS

| | | | |
|---|---|---|---|
| 5,726,709 A * | 3/1998 | Kinoshita et al. | 348/264 |
| 6,611,289 B1 * | 8/2003 | Yu et al. | 348/265 |
| 2004/0095489 A1 * | 5/2004 | Hirose | 348/262 |
| 2005/0219642 A1 | 10/2005 | Yachida et al. | |
| 2007/0189386 A1 | 8/2007 | Imagawa et al. | |

FOREIGN PATENT DOCUMENTS

| | | |
|---|---|---|
| JP | 2003-203237 | 7/2003 |
| JP | 2004-40422 | 2/2004 |
| JP | 3531035 | 3/2004 |
| JP | 2005-318548 | 11/2005 |
| JP | 3934151 | 3/2007 |

OTHER PUBLICATIONS

Okutomi, "Digital Image Processing", Computer Graphics Arts Society (of Japan), (cited in [0089], p. 48 of the description), pp. 202-204 and a concise explanation.

Nobori et al., "Video Super-Resolution of Color-Separated Images with Multiple Spatio-temporal Resolutions", IPSJ SIG Technical Report 2008-CVIM-162 (61) Mar. 11, 2008, pp. 377-384.

Co-pending US National Phase Application, based on PCT/JP2008/001171 filed Nov. 16, 2009 (copy of application enclosed).

* cited by examiner

IMAGE PROCESSING DEVICE, IMAGE PROCESSING METHOD, COMPUTER PROGRAM, RECORDING MEDIUM STORING THE COMPUTER PROGRAM, FRAME-TO-FRAME MOTION COMPUTING METHOD, AND IMAGE PROCESSING METHOD

TECHNICAL FIELD

The present invention relates to image processing on a moving picture, and more particularly relates to a technique for generating a color moving picture with either the resolution or frame rate of the moving picture shot increased through image processing.

BACKGROUND ART

Recently, in the field of image capturing equipment, digital camcorders and digital still cameras have had their image quality and their versatile shooting capabilities tremendously improved by leaps and bounds. Examples of major indices to the image quality of a moving picture that can be shot by these image capture devices include the number of pixels per frame (representing a resolution), the number of frames per second (what is called a "frame rate") and the ratio of image signal to noise (i.e., the signal to noise ratio (SNR)).

Various levels of resolutions are now available and one of them can be used adaptively according to the image quality to be achieved by a given image capture device. For instance, although the resolution of a TV phone is represented by the number of pixels that is roughly as large as what is required by QCIF (Quarter Common Intermediate Format), digital single-lens reflex cameras nowadays have a resolution exceeding 10 megapixels. Likewise, there is a broad range of frame rates available. For example, digital still cameras now achieve a frame rate of several frames per second in the sequential shooting mode, camcorders now have a frame rate of 30 frames per second, and a special-purpose high speed shooting camera could achieve even a frame rate exceeding 1,000 frames per second.

However, it is difficult for imagers (such as CCDs and CMOS image sensors), which are currently used extensively in those image capture devices, to increase pixel data reading rate endlessly. That is to say, the pixel data reading rate should have a certain upper limit. And the upper limit of the pixel data reading rate defines that of the product of a moving picture's resolution and the frame rate. That is why it has been hard for a conventional image capture device to shoot a moving picture so as to achieve both a high resolution and a high frame rate at the same time.

Thus, to overcome such a problem, many techniques have been proposed for generating a moving picture with a high resolution and a high frame rate by subjecting the moving picture to signal processing. For example, according to Patent Document No. 1, two moving pictures with mutually different combinations of resolution and frame rate are shot with two imaging means and then subjected to signal processing, thereby generating a moving picture with a high resolution and a high frame rate.

FIG. 20 illustrates a configuration for a conventional image capture device disclosed in Patent Document No. 1. In this image capture device, a part of the light that has been transmitted through a lens 1001 is further transmitted through a half mirror 1004 and then incident on a film 1002 by way of a shutter 1006. As a result, a moving picture with a high resolution but a low frame rate (i.e., the interval of shooting) is recorded (or shot) on the film 1002. On the other hand, another part of the light that has been transmitted through the lens 1001 is reflected by the half mirror 1004, passed through a lens 1005 and then received by a CCD 1005. Consequently, a moving picture with a low resolution but a high frame rate is shot and written on a storage medium (not shown).

The image capture device determines the correspondence between the image that has been recorded on the film 1002 and the image that has been shot with the CCD 1005 by comparing their edges to each other and generates, based on that correspondence, an image at a timing when an image was certainly shot with the CCD 1005 but was not shot with the film 1002. In this manner, the image capture device can generate an image that has both a high resolution and a high frame rate alike.

A conventional image capture device that uses such two imaging means records a moving picture with a high resolution but at a low frame rate using one of the two imaging means (i.e., the film 1002) and shoots and stores a moving picture with a low resolution but at a high frame rate using the other imaging means (i.e., the CCD 1003). That is why even if two imagers, of which the read rates have an upper limit, are used, a moving picture with a high resolution and a high frame rate, each of which is greater than the sum of the respective upper limits of those two imaging means, can still be generated.

Generally speaking, when a given image has a higher resolution than others, it means that the image has higher spatial frequency components than the other images that have been shot in the same range. Also, "to raise the resolution of a given image" means processing the image so that the processed image has higher spatial frequency components. Strictly speaking, even if a given image has a high resolution (i.e., high spatial frequency components), it does not always mean that the image has a great number of pixels. In other words, an image with a great number of pixels can have, but does not always have, high spatial frequency components. That is why to be an image with a great number of pixels is not synonymous to being an image with a high resolution. Nevertheless, for the sake of simplicity, an image with a great number of pixels is supposed to have a high resolution unless stated otherwise.

Patent Document No. 1: Japanese Patent Publication No. 3531035

DISCLOSURE OF INVENTION

Problems to be Solved by the Invention

In the image capture device described above that uses the two imaging means, however, the incoming light is split into two by the half mirror 1004, and therefore, the intensity of the light that is eventually incident on the film 1002 and on the CCD 1003 is only a half of that of the original incoming light. In other words, this means that the resultant image will be a darker one with a decreased luminance and that the ratio of the image signal to noise (i.e., the SNR) will drop.

It is therefore an object of the present invention to provide an image processing apparatus and processing method that can generate a moving picture with a high resolution, a high frame rate and a high SNR by eliminating such a decrease in SNR that can be occurred when the intensity of the incoming light has been halved by the half mirror.

Means for Solving the Problems

An image processing apparatus according to the present invention generates multi-color moving picture data based on the data of first and second moving pictures. The first moving picture has a first frame rate and is comprised of a number of pictures, each representing a first color component. The second moving picture has a second frame rate, which is higher than the first frame rate, and is comprised of a number of pictures, each representing a second color component that is different from the first color component. Resolution of the second moving picture is equal to or lower than that of the first moving picture. The apparatus includes: a first image synthesizing section, which generates, based on the data of the first and second moving pictures, a synthetic picture by modifying some of the pictures that form the first moving picture and which outputs a synthesized moving picture corresponding to the first moving picture at a higher frame rate than the first frame rate by using the first moving picture and the synthetic picture; and a second image synthesizing section, which receives and synthesizes together the synthesized moving picture and the second moving picture, thereby generating a multi-color moving picture including the first and second color components.

The first image synthesizing section may include: a motion estimating section, which receives the data of the second moving picture and generates motion information based on a change between at least two of the pictures that form the second moving picture; and a motion compensating section for generating the synthetic picture based on the motion information and the data of the first moving picture.

The motion compensating section may generate the synthetic picture by modifying some of the pictures that form the first moving picture in accordance with the motion information.

The first and second moving pictures may have their respective base frame pictures, which have been shot at the same time. The second moving picture may further have an intermediate frame picture that has been shot between two adjacent base frame pictures thereof. The motion estimating section may generate the motion information based on a change between the intermediate frame picture and the base frame picture of the second moving picture. And the motion compensating section may modify the base frame picture of the first moving picture in accordance with the motion information, thereby generating a synthetic picture corresponding to the intermediate frame of the second moving picture.

The motion estimating section may generate the motion information based on a change between the intermediate frame picture of the second moving picture and a base frame picture thereof that has been shot before the intermediate frame picture.

Alternatively, the motion estimating section may generate the motion information based on a change between the intermediate frame picture of the second moving picture and a base frame picture thereof that has been shot after the intermediate frame picture.

The motion estimating section may generate motion information S based on a change between the intermediate frame picture U of the second moving picture and a base frame picture S thereof that has been shot before the intermediate frame picture, and may also generate motion information T based on a change between the intermediate frame picture U of the second moving picture and a base frame picture T thereof that has been shot after the intermediate frame picture. The motion compensating section modifies the base frame picture S of the first moving picture, corresponding to the base frame picture S of the second moving picture, in accordance with the motion information S, and also modifies the base frame picture T of the first moving picture, corresponding to the base frame picture T of the second moving picture, in accordance with the motion information T, thereby generating a synthetic picture corresponding to the intermediate frame U of the second moving picture.

The motion estimating section may define multiple areas for each of the at least two pictures, and may generate motion information about each said area based on a change in image within that area. The motion compensating section may define multiple areas for each of the pictures that form the first moving picture, and may modify each said area in accordance with the motion information, thereby generating a single synthetic picture.

By using a temporal correlation between the first and second moving pictures as an evaluation value, the motion compensating section may generate a synthetic picture corresponding to the first moving picture at an arbitrary timing based on the data of the first and second moving pictures and the motion information.

By using a temporal correlation between the synthesized moving picture and the second moving picture as an evaluation value, the motion compensating section may correct the pixel values of the synthetic picture included in the synthesized moving picture.

The apparatus may further include a resolution raising section, which receives the data of the synthesized moving picture corresponding to the first moving picture and the data of the second moving picture, and raises the resolution of the second moving picture based on information about pictures that form the synthesized moving picture, thereby generating a synthesized moving picture corresponding to the second moving picture. The synthesizing section may receive the synthesized moving picture corresponding to the second moving picture instead of the second moving picture itself, and may synthesize the respective synthesized moving pictures corresponding to the first and second moving pictures together, thereby generating the multi-color moving picture.

The resolution raising section may raise the resolution of the second moving picture in accordance with information about the pictures that form the synthesized moving picture corresponding to the first moving picture, and may use a spatial correlation between the second moving picture and the synthesized moving picture corresponding to the first moving picture as an evaluation value for generating the synthesized moving picture corresponding to the second moving picture.

The motion estimating section may receive the data of the first and second moving pictures, may generate not only a base frame resolution converted picture by converting the resolution of the base frame picture of the second moving picture using the base frame picture of the first moving picture but also an intermediate frame resolution converted picture by converting the resolution of the intermediate frame picture of the second moving picture using the base frame picture of the first moving picture, may further generate the motion information based on a degree of similarity between the base frame resolution converted picture and the intermediate frame resolution converted picture, and may output the motion information as the motion information of the second moving picture.

The motion estimating section may generate the converted moving picture by converting the resolution of the second moving picture based on a spatial correlation between associated pictures of the first and second moving pictures.

The apparatus may be able to generate multi-color moving picture data based on the data of a third moving picture, too. The third moving picture may have a third frame rate, which is higher than the first frame rate, and may be comprised of a number of pictures, each representing a third color compo- nent that is different from the first and second color components. The resolution of the third moving picture may be equal to or lower than that of the first moving picture. The motion estimating section may further receive the data of the third moving picture and may generate motion information based on a change between at least two of the pictures that form the second moving picture. The motion compensating section may generate the synthesized moving picture corresponding to the first moving picture based on the motion information about the second and third moving pictures and the data of the first moving picture. The synthesizing section may receive and synthesize together the synthesized moving picture and the second and third moving pictures, thereby generating a multi-color moving picture including the first, second and third color components.

Pixels may be arranged in spatially different locations between the second and third moving pictures.

The first color component may be green.

The apparatus may further include: a color separating section for splitting light received into at least two light beams that have the first and second color components, respectively; and an image capturing section for shooting the first and second moving pictures based on the split light beams with the first and second color components, respectively. The image capturing section may shoot the first moving picture with a resolution that is equal to or higher than the resolution of the second moving picture and at a frame rate that is less than the frame rate of the second moving picture.

The image capturing section may control the resolutions and the frame rates of the moving pictures representing multiple color components according to the type of the moving picture that has been shot.

An image processing method according to the present invention is a method for generating multi-color moving picture data based on the data of first and second moving pictures. The first moving picture has a first frame rate and is comprised of a number of pictures, each representing a first color component. The second moving picture has a second frame rate, which is higher than the first frame rate, and is comprised of a number of pictures, each representing a second color component that is different from the first color component. Resolution of the second moving picture is equal to or lower than that of the first moving picture. The method includes the steps of: generating, based on the data of the first and second moving pictures, a synthetic picture by modifying some of the pictures that form the first moving picture and outputting a synthesized moving picture corresponding to the first moving picture at a higher frame rate than the first frame rate by using the first moving picture and the synthetic picture; and receiving and synthesizing together the synthesized moving picture and the second moving picture, thereby generating a multi-color moving picture including the first and second color components.

A computer program according to the present invention is defined to make a processor, built in an image processing apparatus, generate multi-color moving picture data based on the data of first and second moving pictures. The first moving picture has a first frame rate and is comprised of a number of pictures, each representing a first color component. The second moving picture has a second frame rate, which is higher than the first frame rate, and is comprised of a number of pictures, each representing a second color component that is different from the first color component. Resolution of the second moving picture is equal to or lower than that of the first moving picture. The computer program is defined to make the processor perform the steps of: generating, based on the data of the first and second moving pictures, a synthetic picture by modifying some of the pictures that form the first moving picture and outputting a synthesized moving picture corresponding to the first moving picture at a higher frame rate than the first frame rate by using the first moving picture and the synthetic picture; and receiving and synthesizing together the synthesized moving picture and the second moving picture, thereby generating a multi-color moving picture including the first and second color components.

The computer program may be stored on a storage medium.

The motion estimating section may generate a combined moving picture by calculating a weighted sum of the respective pictures that form the second and third moving pictures with the spatial arrangement of pixels taken into account and may also generate the motion information based on a change between at least two of the pictures that form the combined moving picture generated.

The motion estimating section may generate a combined moving picture by calculating a weighted sum of the respective pictures that form the second and third moving pictures with the spatial arrangement of pixels taken into account, may also generate a base frame resolution converted picture by converting the resolution of the base frame picture of the combined moving picture using the base frame picture of the first moving picture and an intermediate frame resolution converted picture by converting the resolution of the intermediate frame picture of the combined moving picture using the base frame picture of the first moving picture, and may further generate the motion information based on a change between the base frame resolution converted picture and the intermediate frame resolution converted picture.

The resolution raising section may raise the resolution of the second moving picture in accordance with information about the pictures that form the synthesized moving picture corresponding to the first moving picture, and may add high frequency components, which are included in the synthesized moving picture corresponding to the first moving picture, to the second moving picture when generating a synthesized moving picture corresponding to the second moving picture.

The resolution raising section may raise the resolution of the second moving picture in accordance with information about the pictures that form the synthesized moving picture corresponding to the first moving picture, and may increase the degree of correlation between the synthesized moving picture corresponding to the first moving picture and a synthetic picture corresponding to the second moving picture when generating a synthesized moving picture corresponding to the second moving picture.

The resolution raising section may raise the resolution of the second moving picture in accordance with information about the pictures that form the synthesized moving picture corresponding to the first moving picture, and may change the degrees of correlation between the respective pictures that form the synthesized moving pictures corresponding to the first and second moving pictures according to the degree of correlation between the respective pictures that form the first moving picture and the ones that form the second moving picture.

The resolution raising section may raise the resolution of the second moving picture in accordance with information about the pictures that form the synthesized moving picture corresponding to the first moving picture, and may generate pictures to form the synthesized moving picture corresponding to the second moving picture by interpolating and expanding the pictures that form the second moving picture as for an area where there is a low degree of correlation between the respective pictures that form the first moving picture and the ones that form the second moving picture.

An inter-frame motion estimating method according to the present invention is a method for estimating a motion between associated constituent frames of first and second moving pictures based on the data of the first and second moving pictures. The first moving picture has a first frame rate and is comprised of a number of pictures. The second moving picture has a second frame rate, which is higher than the first frame rate, and is also comprised of a number of pictures. Resolution of the second moving picture is equal to or lower than that of the first moving picture. The first and second moving pictures have their respective base frame pictures, which have been shot at the same time. The second moving picture further has an intermediate frame picture that has been shot between two adjacent base frame pictures thereof. The method includes the steps of: receiving the data of the first and second moving pictures, and generating a base frame resolution converted picture by converting the resolution of the base frame picture of the second moving picture using the base frame picture of the first moving picture; generating an intermediate frame resolution converted picture by converting the resolution of the intermediate frame picture of the second moving picture using the base frame picture of the first moving picture; and generating the motion information based on a degree of similarity between the base frame resolution converted picture and the intermediate frame resolution converted picture.

The first moving picture may be comprised of a number of pictures, each representing a first color component, and the second moving picture may be comprised of a number of pictures, each representing a second color component that is different from the first color component.

An image processing method according to the present invention is a method for generating the data of a combined moving picture based on the data of first and second moving pictures. The first moving picture has a first frame rate and is comprised of a number of pictures. The second moving picture has a second frame rate, which is higher than the first frame rate, and is also comprised of a number of pictures. The first and second moving pictures have their respective base frame pictures, which have been shot at the same time. The second moving picture further has an intermediate frame picture that has been shot between two adjacent base frame pictures thereof. The method includes the steps of: receiving the data of the first and second moving pictures, and generating a base frame resolution converted picture by converting the resolution of the base frame picture of the second moving picture using the base frame picture of the first moving picture; generating an intermediate frame resolution converted picture by converting resolution of the intermediate frame picture of the second moving picture using the base frame picture of the first moving picture; generating the motion information based on a degree of similarity between the base frame resolution converted picture and the intermediate frame resolution converted picture; and generating, based on the data of the first and second moving pictures and the motion information, a synthetic picture by modifying some of the pictures that form the first moving picture and outputting a synthesized moving picture corresponding to the first moving picture at a higher frame rate than the first frame rate by using the first moving picture and the synthetic picture.

EFFECTS OF THE INVENTION

A multi-color image processing apparatus according to the present invention can generate a multi-color moving picture that has both a high resolution and a high frame rate alike based on moving pictures representing multiple color components with mutually different resolutions and different frame rates.

Figure 8:
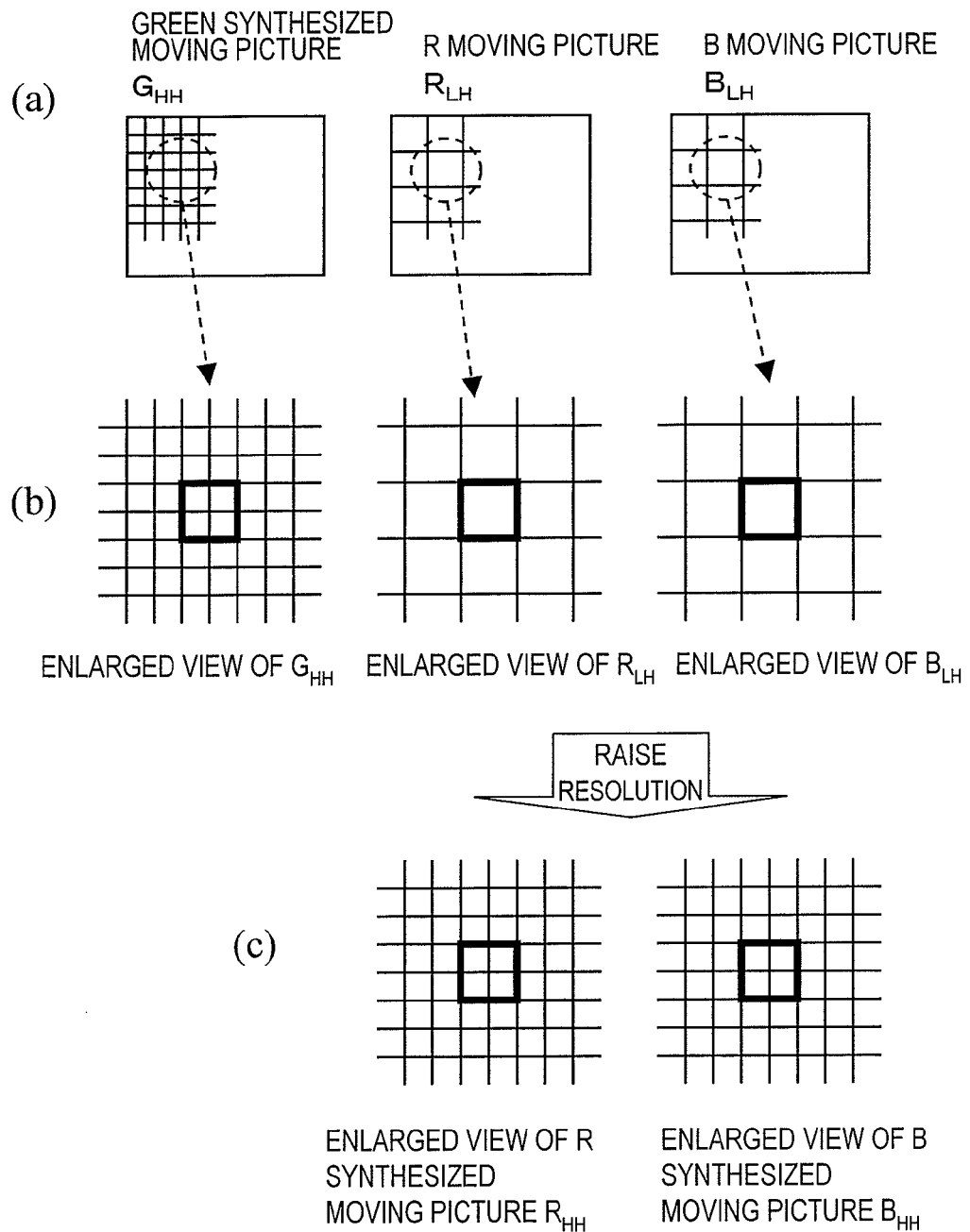

Portion (a) of FIG. 8 illustrates the arrangements of pixels in the red and blue moving pictures $R_{LH}$ and $B_{LH}$, the green synthesized moving picture $G_{HH}$ and the red and blue synthesized moving pictures $R_{HH}$ and $B_{HH}$ in the same frame (i.e., at the same timing). Portion (b) of FIG. 8 illustrates some of pixels that form the respective moving pictures on a larger scale. Portion (c) of FIG. 8 illustrates groups of pixels that have had their resolution raised and that correspond to the pixels of the red and blue moving pictures shown in portion (b) of FIG. 8.

Figure 9:
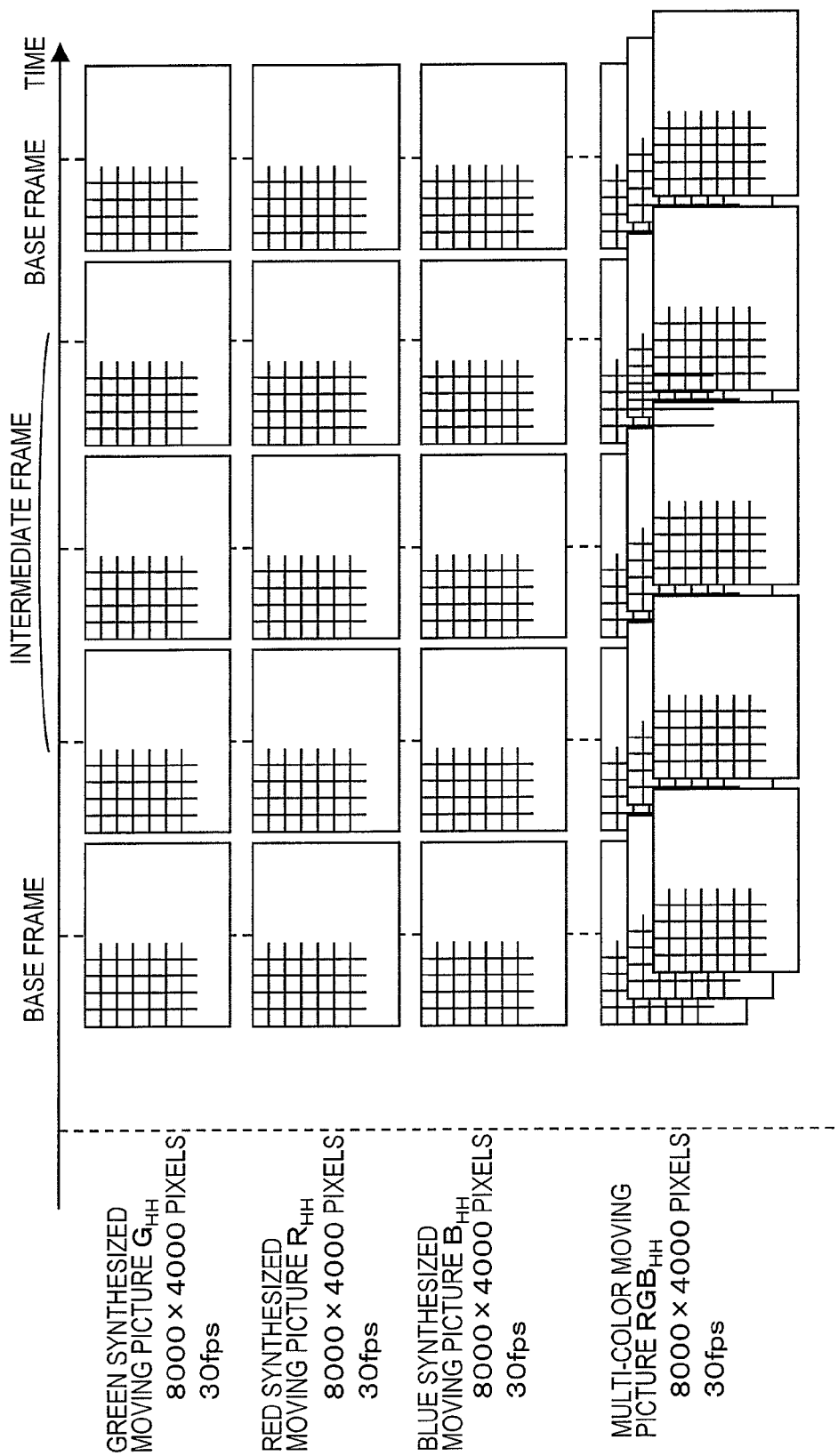

FIG. 9 illustrates an example of a synthesized moving picture and a multi-color moving picture that have been generated as a result of the operations of the respective sections of the image processing section 106.

Figure 10:
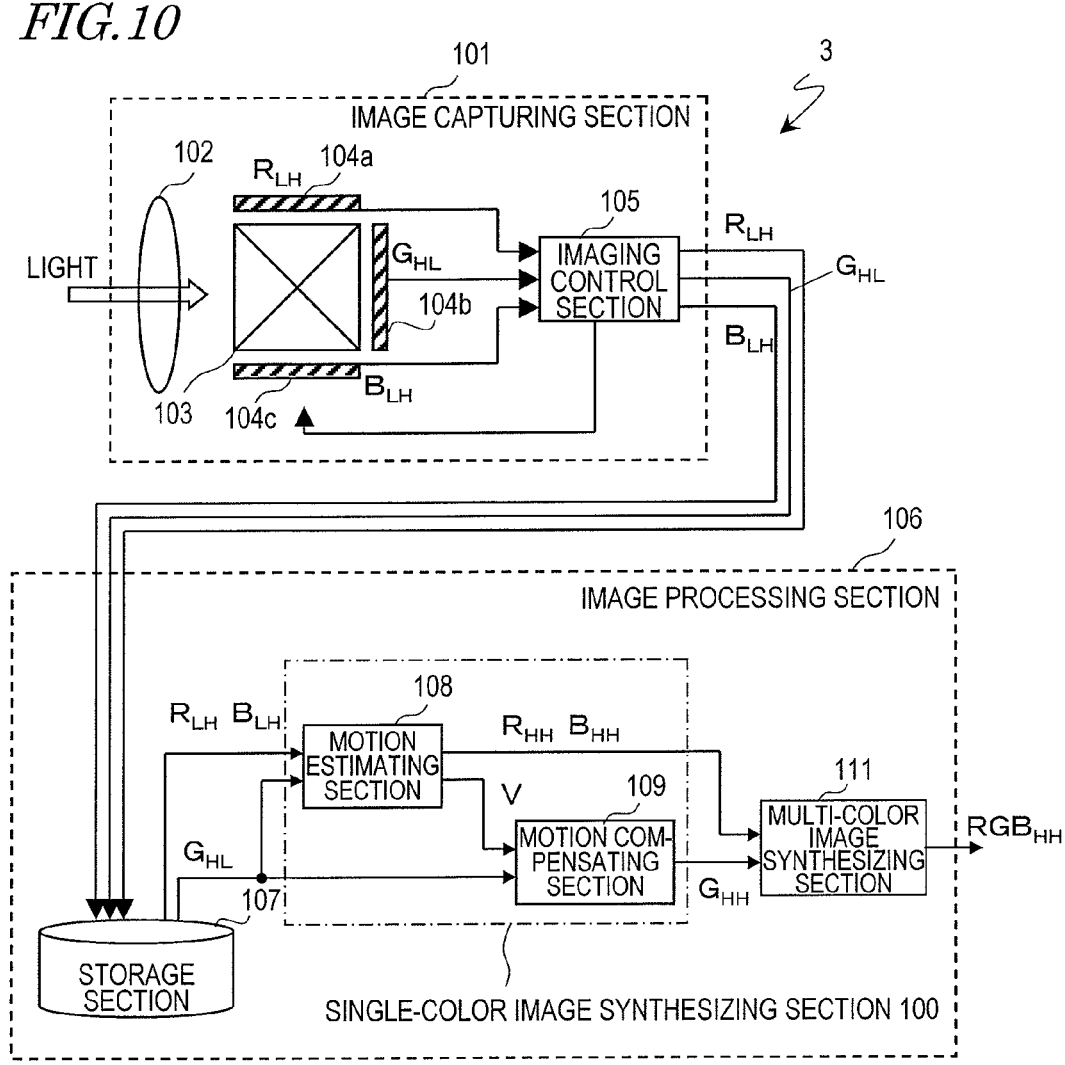

FIG. 10 illustrates a configuration for a multi-color image processing apparatus 3 as a third preferred embodiment of the present invention.

Figure 11:
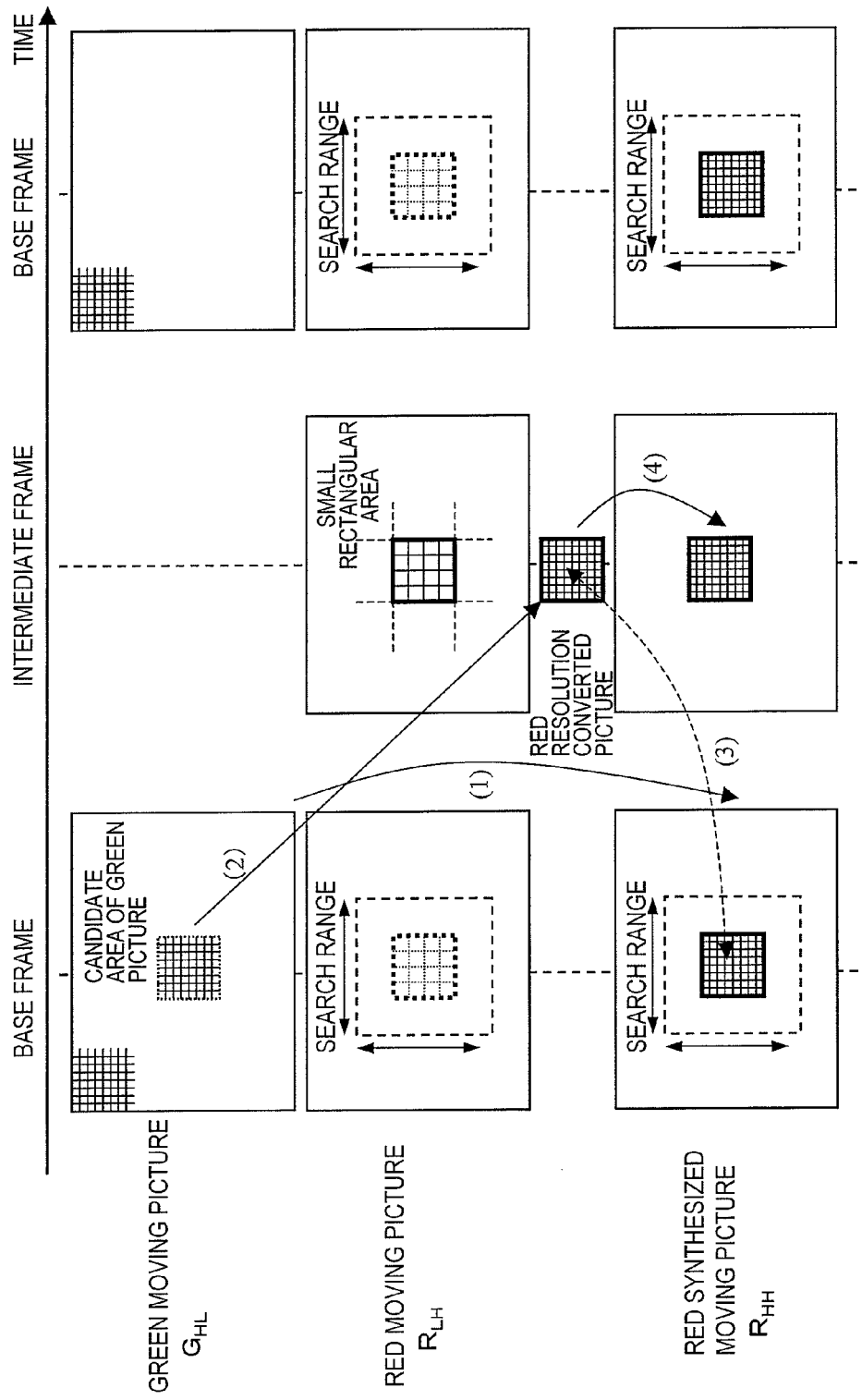

FIG. 11 illustrates conceptually how the motion compensating section 109 generates a red synthesized moving picture $R_{HH}$.

Figure 12:
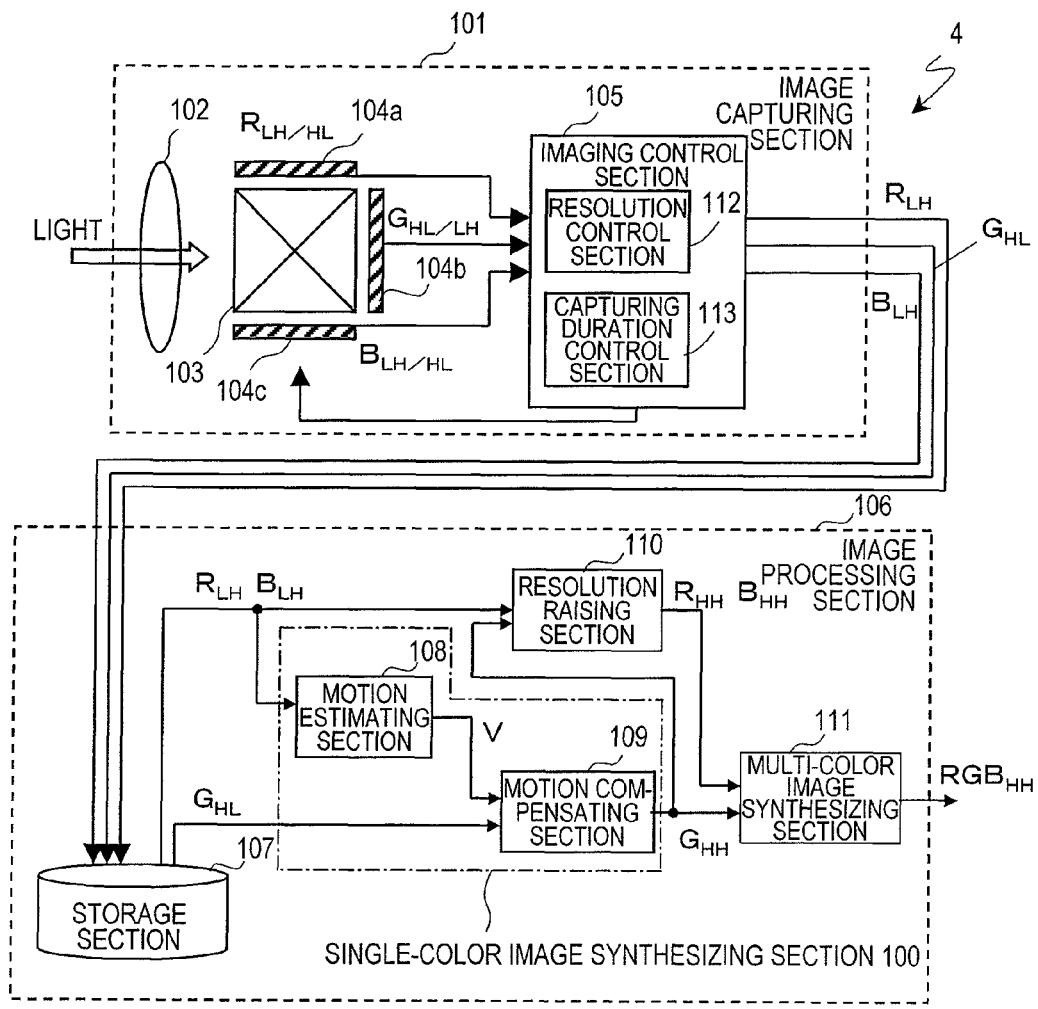

FIG. 12 illustrates a configuration for a multi-color image processing apparatus 4 as a fourth preferred embodiment of the present invention.

Figure 13:
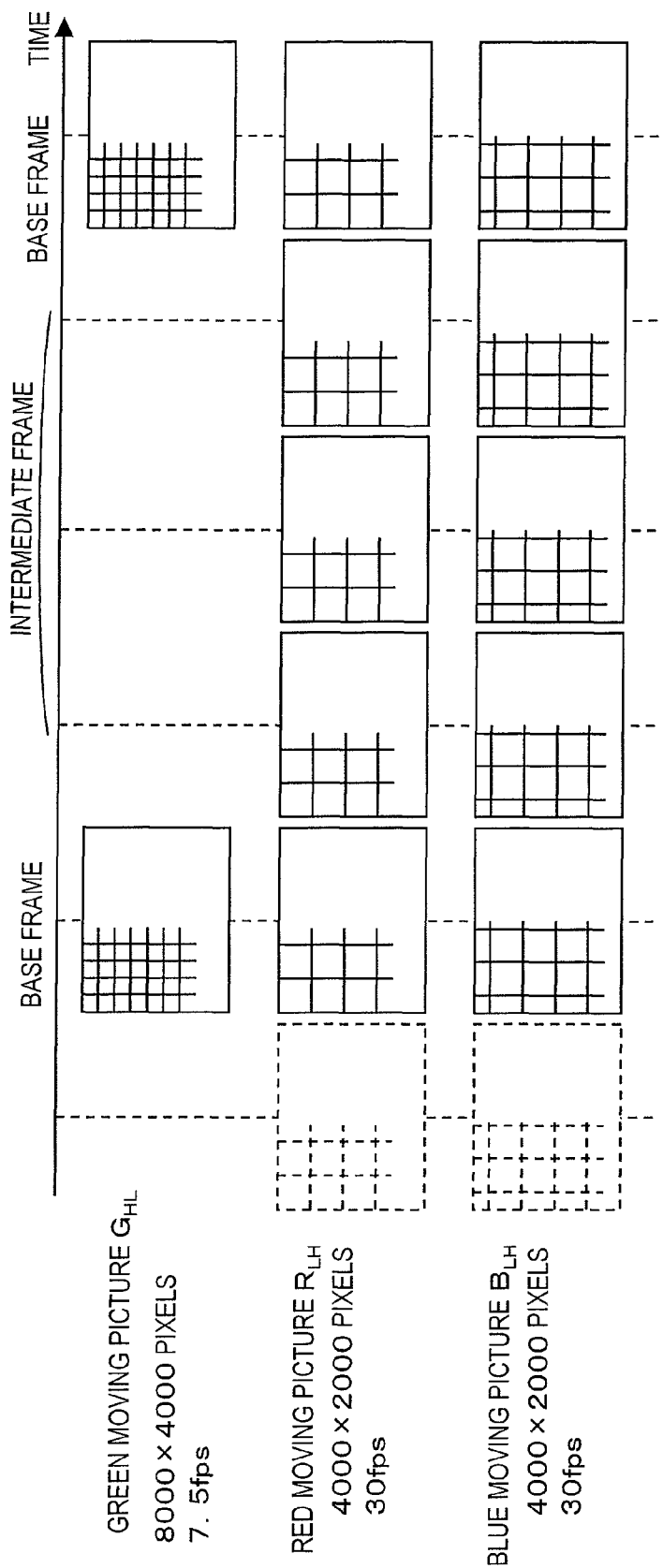

FIG. 13 illustrates exemplary pictures representing second and third color components, of which the pixel locations are shifted from each other.

Figure 14:
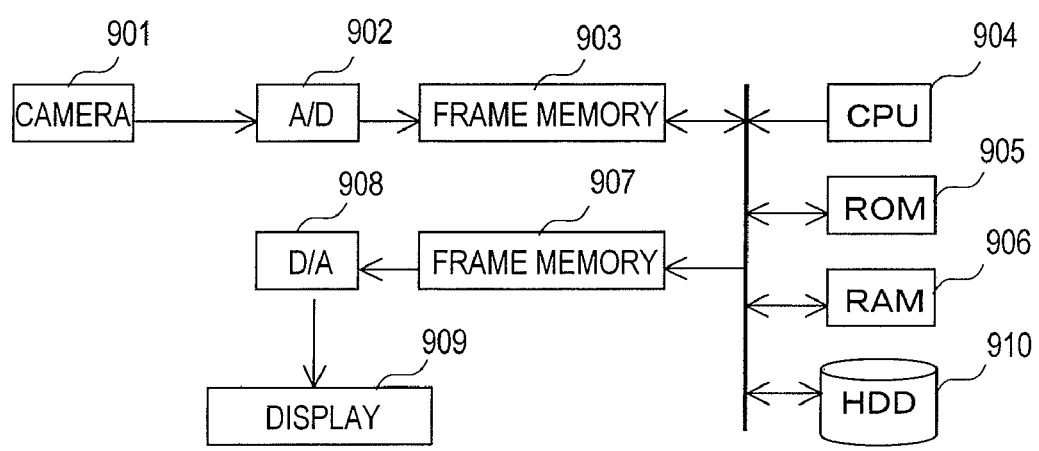

FIG. 14 illustrates a hardware configuration for a multi-color image processing apparatus implemented as a computer.

Figure 15:
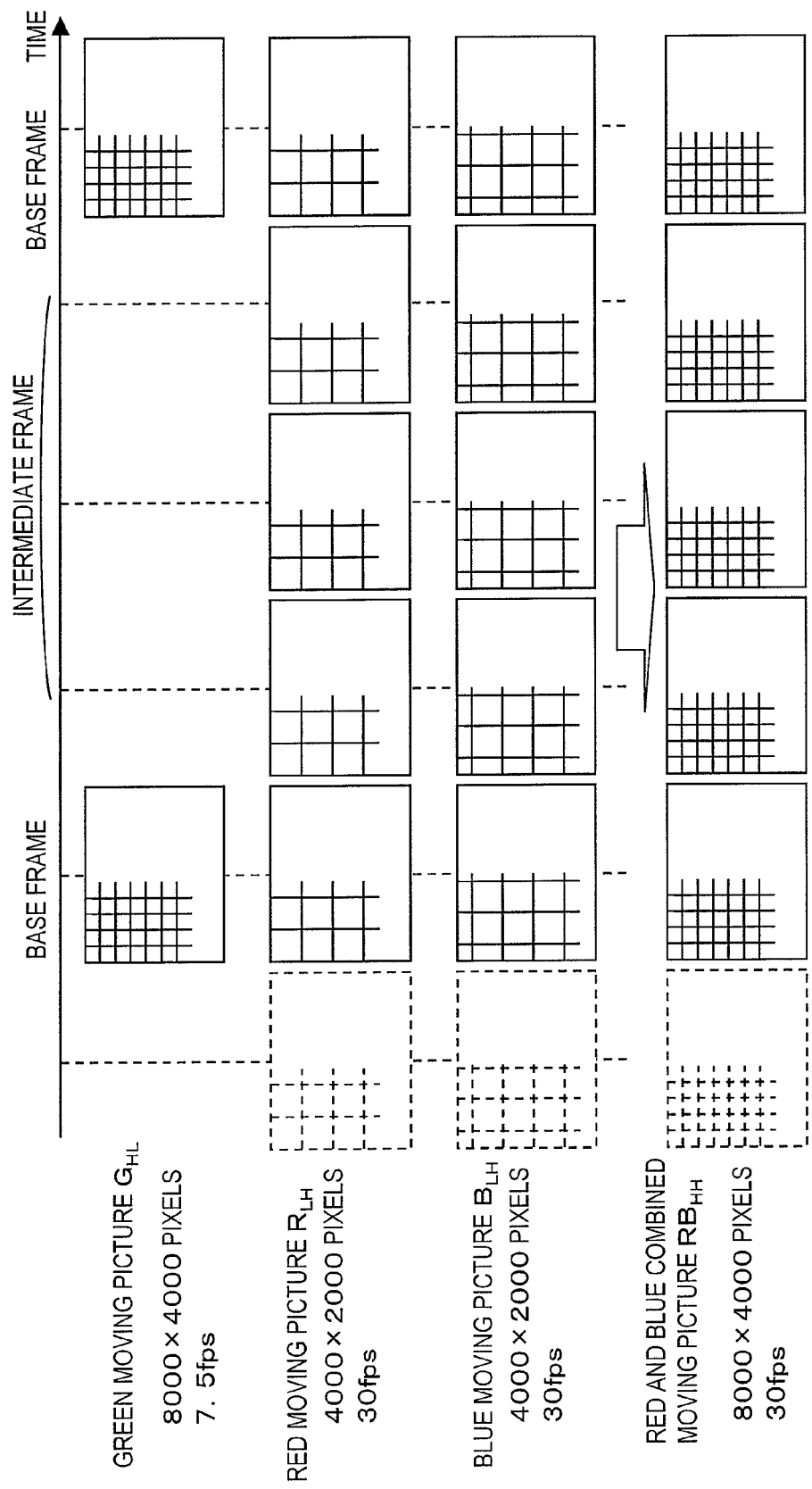

FIG. 15 illustrates an exemplary combined picture that has been generated based on such pictures representing second and third color components, of which the pixel locations are shifted from each other.

Figure 16:
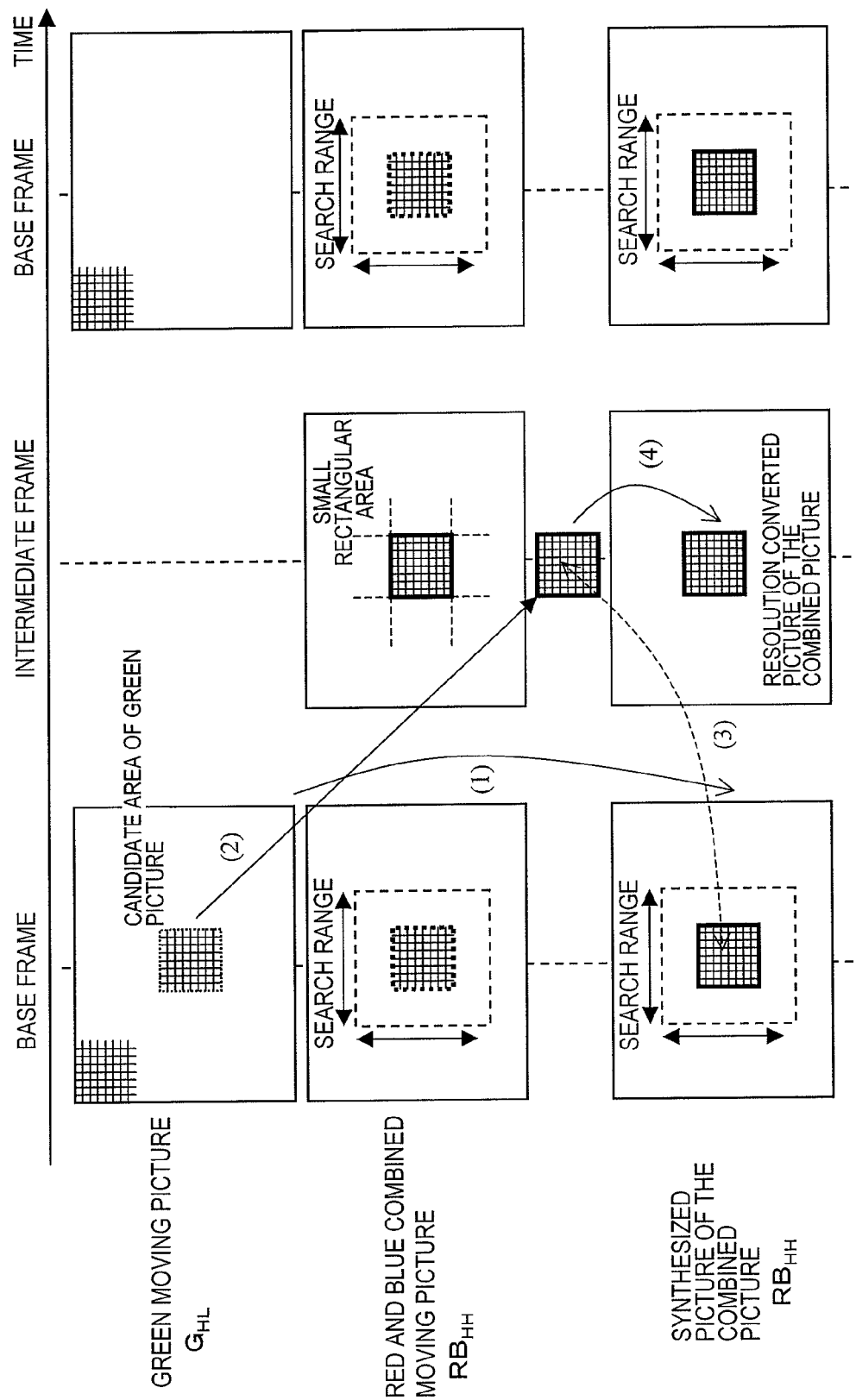

FIG. 16 illustrates conceptually how the motion estimating section 108 of a fifth preferred embodiment of the present invention calculates the motion information.

Figure 17:
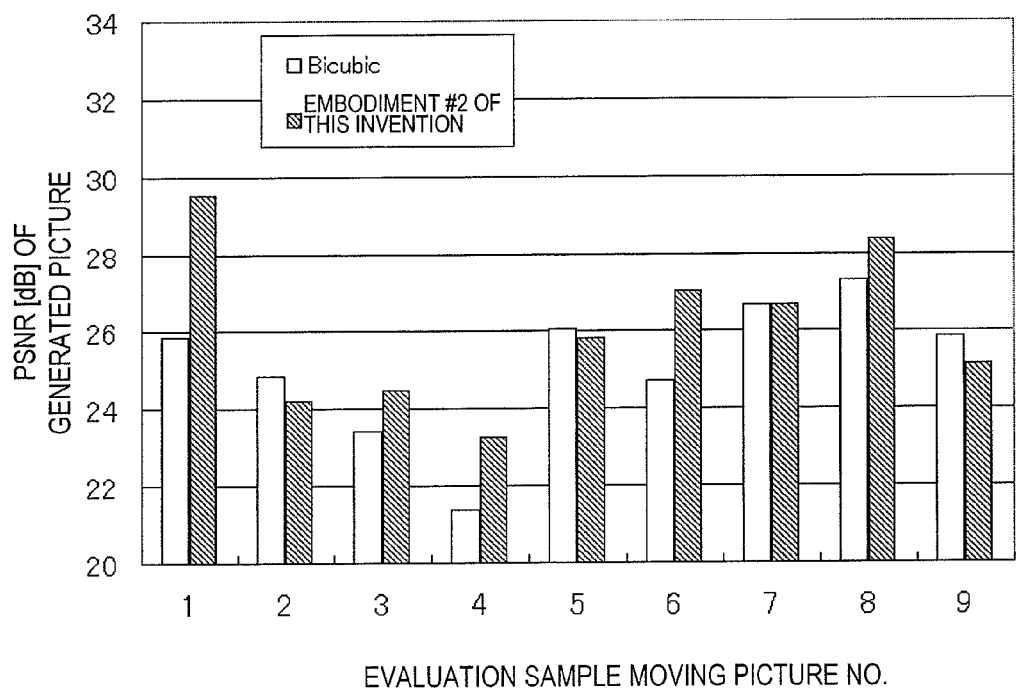

FIG. 17 shows the results of experiments that prove how effective it was to use the multi-color image processing apparatus 2 of the second preferred embodiment.

Figure 18:
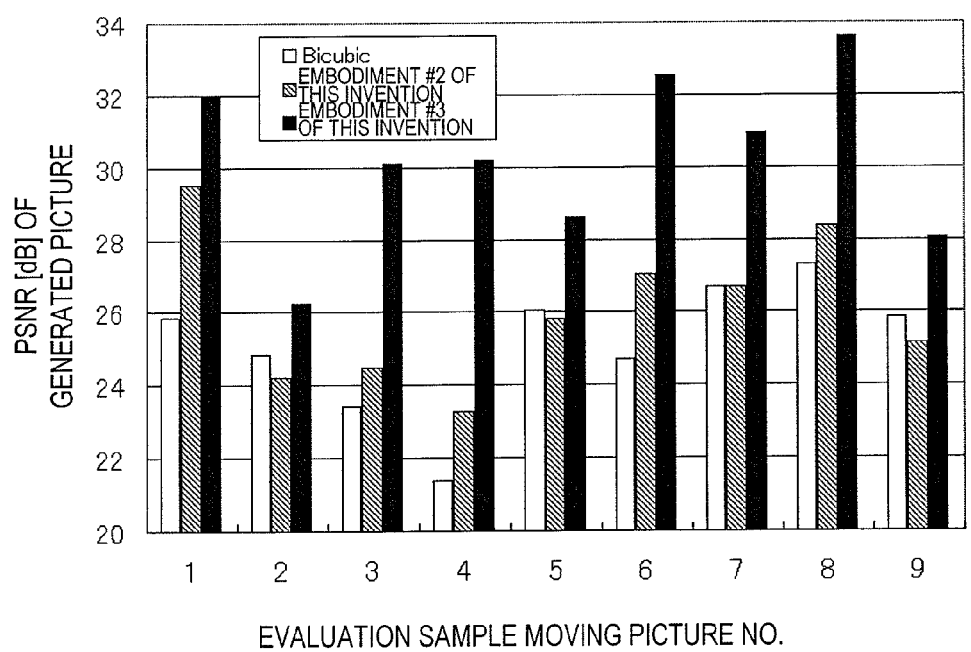

FIG. 18 shows the results of experiments that were carried out to find the PSNRs of multi-color moving pictures that had been generated by the multi-color image processing apparatus 3 of the third preferred embodiment.

Figure 19:
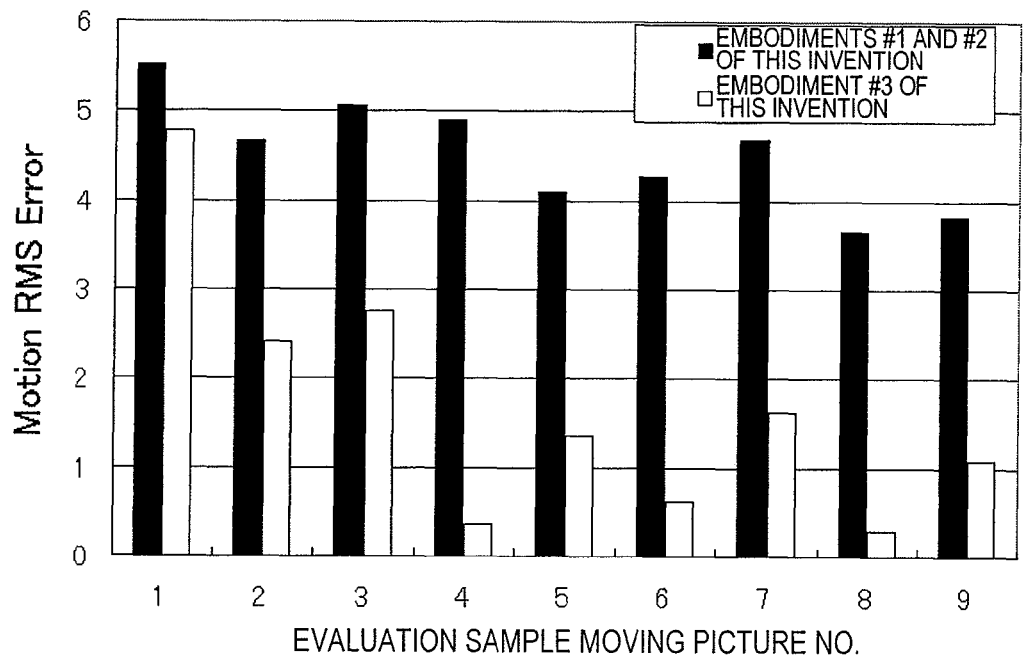

FIG. 19 shows the results of experiments that were carried out on the motion information V generated by the multi-color image processing apparatus 3 of the third preferred embodiment.

Figure 20:
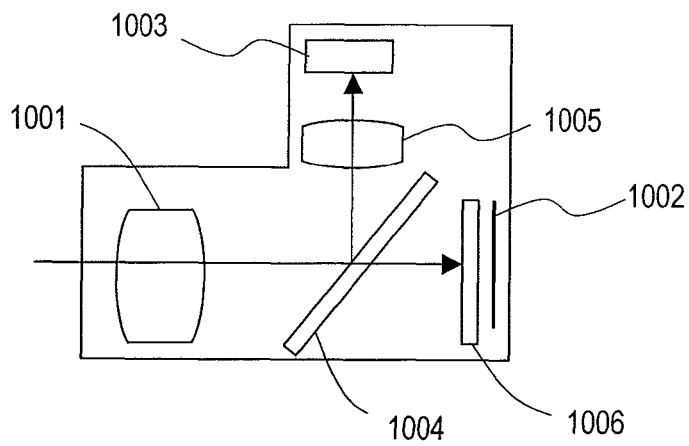

FIG. 20 illustrates a configuration for a conventional image capture device.

DESCRIPTION OF REFERENCE NUMERALS

| | |
|---|---|
| 101 | image capturing section |
| 102 | lens system |
| 103 | color component separating section |
| 104 | imager |
| 105 | imaging control section |
| 106 | image processing section |
| 107 | storage section |
| 108 | motion estimating section |
| 109 | motion compensating section |
| 110 | resolution raising section |
| 111 | multi-color image synthesizing section |

BEST MODE FOR CARRYING OUT THE INVENTION

Hereinafter, preferred embodiments of a multi-color image processing apparatus according to the present invention will be described with reference to the accompanying drawings. In the preferred embodiments to be described below, the multi-color image processing apparatus is designed to generate a moving picture with as high a resolution as approximately 8,000 pixels×4,000 pixels, as high a frame rate as about 30 frames per second, for example, and a high SNR.

Embodiment 1

Figure 1:
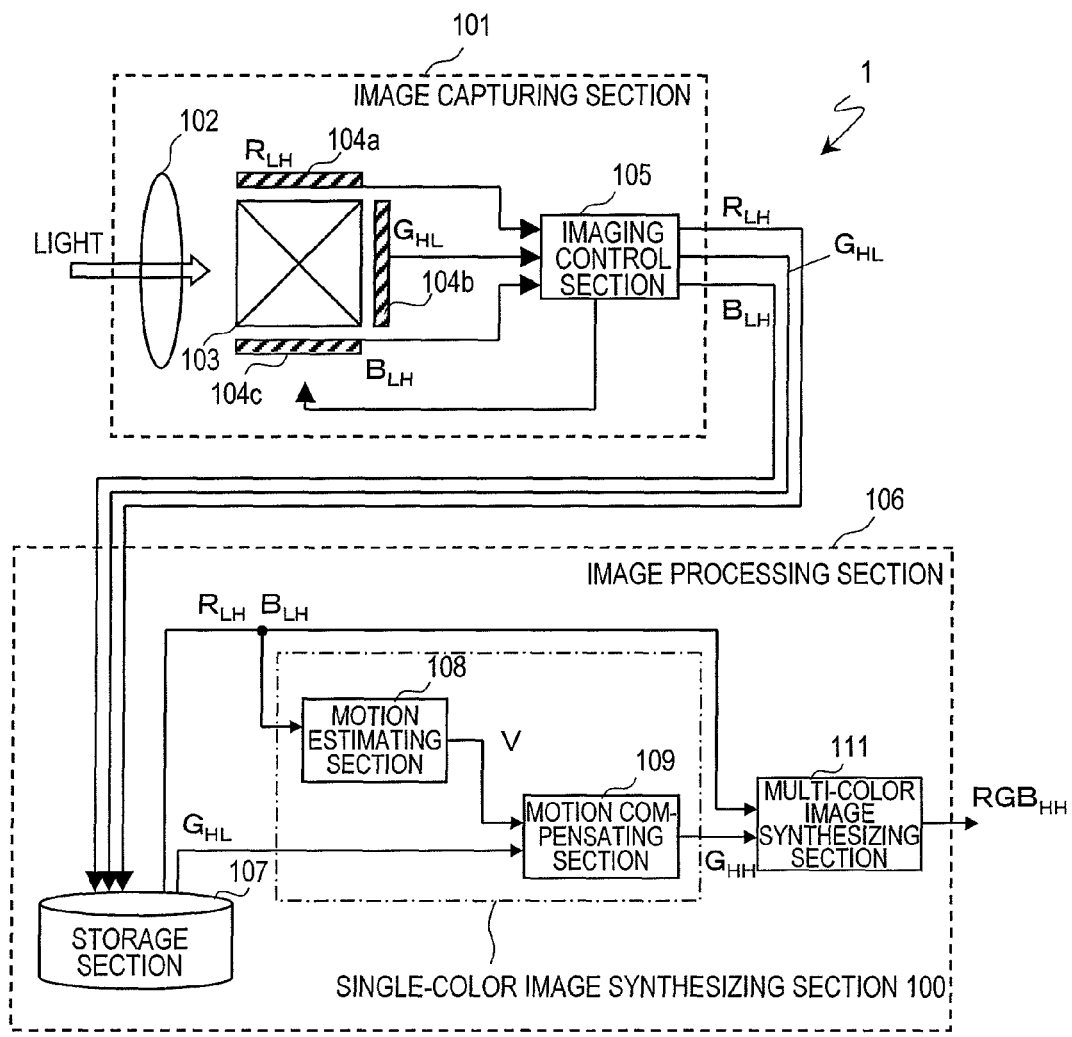
FIG. 1 illustrates a configuration for a multi-color image processing apparatus 1 as a first specific preferred embodiment of the present invention.

FIG. 1 illustrates a configuration for a multi-color image processing apparatus 1 as a first specific preferred embodiment of the present invention.

The multi-color image processing apparatus 1 includes an image capturing section 101 and an image processing section 106. The image capturing section 101 shoots and outputs a moving picture consisting of at least two color components. On the other hand, the image processing section 106 receives the data of the moving picture that has been shot by the image capturing section 101 and that consists of multiple color components and generates a multi-color moving picture that has both a high resolution and a high frame rate alike.

Hereinafter, the respective components of the image capturing section 101 and the image processing section 106 will be described in detail one by one.

The image capturing section 101 includes a lens system 102, a color component separating section 103, three imagers 104a through 104c, and an imaging control section 105. In the following description, those three imagers 104a through 104c will be collectively referred to herein as "imagers 104".

The lens system 102 produces an optical image of a subject on the imagers 104.

The color component separating section 103 splits the light that has passed through the lens 102 into light beams with the three color components of red (R), green (G) and blue (B). In FIG. 1, those split light beams representing red, green and blue are transmitted upward, rightward and downward, respectively. In this preferred embodiment, the color component separating section 103 is implemented as a dichroic prism, for example.

The imagers 104a through 104c respectively shoot the three color component pictures that have been separated by the color component separating section 103. Specifically, the imagers 104a, 104b and 104c shoot pictures representing the red, green and blue components, respectively. The imagers 104a through 104c may be implemented as CCDs, for example.

The imaging control section 105 gives exposure time and reading control signals to the imagers 104a through 104c at predetermined timings, thereby reading pictures with the respective color components from the imagers 104a through 104c. Those pictures are read as analog signals. Then, the imaging control section 105 digitizes those pictures that have been received as analog signals and outputs moving picture data with the three color components, which will be stored in the storage section 107 as will be described later. Optionally, an A/D converter may be provided for each of those imagers 104a through 104c so that the imagers 104a through 104c output digital signals. In that case, the imaging control section 105 will receive those digital signals and output them either as they are or after having subjected them to some signal processing required.

It should be noted that not all of the moving picture data with the respective color components to be output from the image capturing section 101 have the same resolution or the same frame rate. Supposing moving pictures representing any two out of the three color components are called a "first moving picture" and a "second moving picture", respectively, the first moving picture has a resolution that is equal to or higher than that of the second moving picture and has a lower frame rate than the second moving picture. In that case, the moving picture representing the other color component (which may be called a "third moving picture") has the same resolution and the same frame rate as the second moving picture.

In this preferred embodiment, the first, second and third color components are supposed to be green, red and blue, respectively. In the following description, a moving picture representing a green (G) component with a high (H) resolution and a low (L) frame rate will be identified herein by $G_{HL}$, and red (R) and blue (B) components with a low (L) resolution and a high (H) frame rate will be identified herein by $R_{LH}$ and $B_{LH}$, respectively. That is to say, the first letter represents the color component, the second letter (i.e., the first subscript) represents the resolution and the third letter (i.e., the second subscript) represents the frame rate.

Also, in this description, a moving picture representing a green component will sometimes be referred to herein as a "green moving picture" for the sake of simplicity of description.

The image processing section 106 includes a storage section 107, a single-color image synthesizing section 100 and a multi-color image synthesizing section 111.

The storage section 107 temporarily retains the moving pictures representing the three color components that have been supplied from the image capturing section 101. The storage section 107 not only receives and stores the moving pictures from the image capturing section but also outputs the temporarily stored moving pictures at the request of another component of the image processing section 106 to be described later. The storage section 107 may be a buffer memory, a hard disk or an optical disc, for example.

The single-color image synthesizing section 100 and the multi-color image synthesizing section 111 are functional blocks that perform mutually different kinds of image synthesizing processing. First of all, the single-color image synthesizing section 100 performs image processing on the green component and then the multi-color image synthesizing section 111 performs image processing to synthesize together the moving pictures representing all three color components.

The single-color image synthesizing section 100 generates a synthetic picture by changing some of the pictures that form the green moving picture based on the green moving picture data and blue and/or red moving picture data. Next, using that synthetic picture generated and the green moving picture, the single-color image synthesizing section 100 outputs a green synthesized moving picture that has a higher frame rate than the green moving picture.

The single-color image synthesizing section 100 includes a motion estimating section 108 and a motion compensating section 109.

The motion estimating section 108 retrieves the red and blue moving pictures $R_{LH}$ and $B_{LH}$, representing the second and third color components, that are stored in the storage section 107, calculates the magnitude of motion between respective frame pictures (i.e., the variation in coordinates between the pictures) and outputs it as motion information V.

The motion compensating section 109 receives the motion information V that has been calculated by the motion estimating section 108 and the first color component (i.e., the green moving picture $G_{HL}$) that is stored in the storage section 107, generates a green synthetic picture at an arbitrary timing by motion compensation, and then generates and outputs a green synthesized moving picture $G_{HH}$ with a high frame rate. The processing performed by the motion compensating section 109 will be described in further detail later.

The multi-color image synthesizing section 111 receives the green synthesized moving picture $G_{HH}$ that has been generated by the motion compensating section and the red and blue moving pictures $R_{LH}$ and $B_{LH}$ that are stored in the storage section 107, and performs expansion by interpolation on those pictures, thereby equalizing the resolutions of these moving pictures representing the three color components with each other. Then, the multi-color image synthesizing section 111 generates and outputs a multi-color moving picture $RGB_{HH}$ consisting of those moving pictures representing the three color components.

The motion estimating section 108, the motion compensating section 109 and the multi-color image synthesizing section 111 may be implemented as an image processor. Or the function of the motion estimating section 108, the motion compensating section 109 and the multi-color image synthesizing section 111 may also be carried out by getting a computer program, describing the procedures of processing of these sections, executed by a processor.

Hereinafter, it will be described how the multi-color image processing apparatus 1 with such a configuration operates.

In the image capturing section 101, a subject's image is passed through the lens system 102 and the color component separating section 103 and then produced on the imagers 104 as the three color components separated.

The imaging control section 105 reads pictures representing the respective color components from the red and blue imagers 104a and 104c at a predetermined frame rate and also reads a picture representing a green component from the green imager 104b at a lower frame rate than the one used to read the red and blue component pictures. Then, the imaging control section 105 digitizes the respective pictures and stores the image data of the green, red and blue moving pictures $G_{HL}$, $R_{LH}$ and $B_{LH}$ in the storage section 107.

Figure 2:
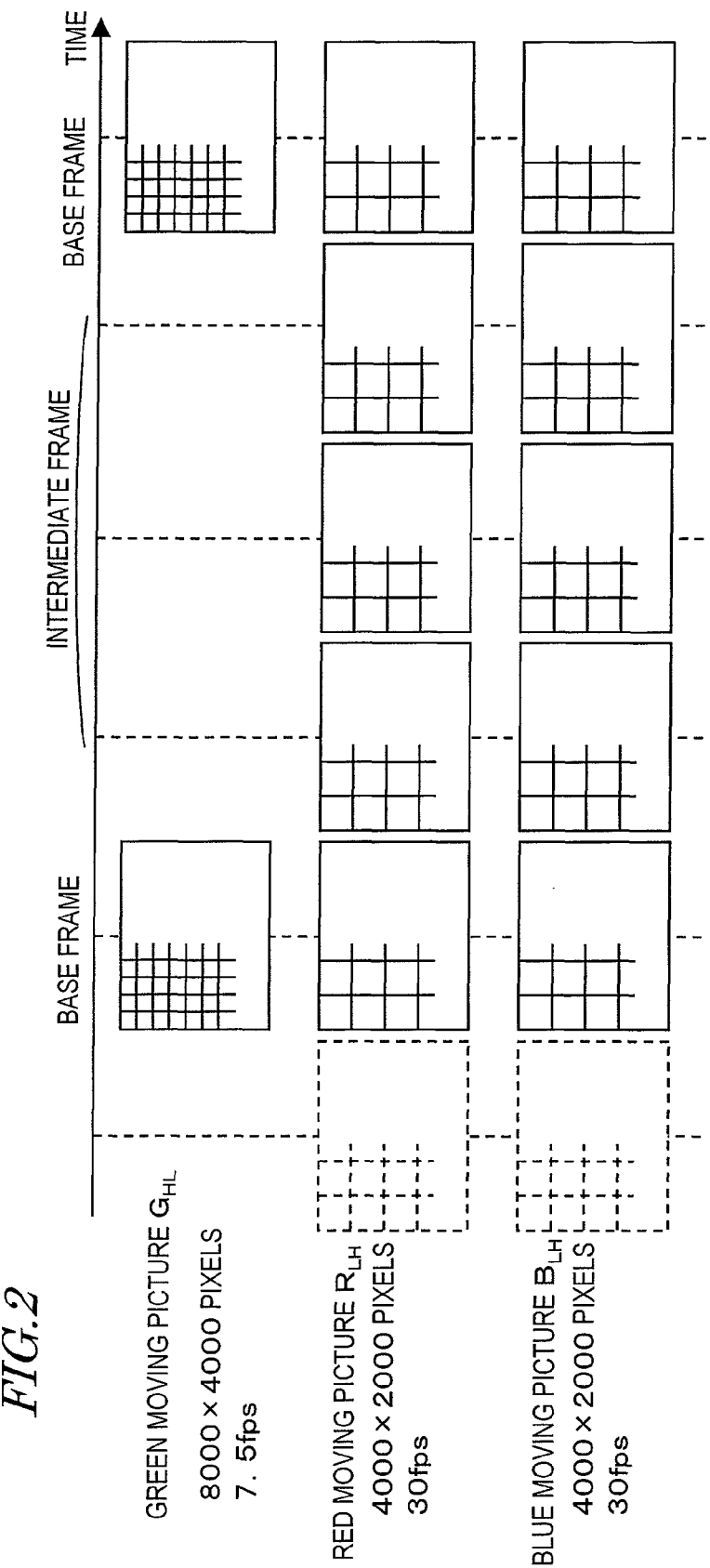
FIG. 2 illustrates an example of moving pictures representing the three color components that have been output from an image capturing section 101.

FIG. 2 illustrates an example of moving pictures representing the three color components that have been output from the image capturing section 101. In FIG. 2, the abscissa represents the time, and the pictures and pixels (i.e., the squares of the lattice figures) are scaled to their actual sizes on the imagers 104. That is to say, if the respective pictures have the same size, then it means that those pictures were shot in the same range. In this case, it means that a picture with smaller pixels (i.e., a picture consisting of a greater number of pixels) has a higher resolution.

In this preferred embodiment, the number of pixels of the imager 104b that shoots a green picture (i.e., the resolution of the green moving picture $G_{HL}$ to be output from the image capturing section 101) is supposed to be 8,000 horizontal pixels by 4,000 vertical pixels. And the green moving picture $G_{HL}$ is supposed to be output at a frame rate of 7.5 frames per second (fps).

On the other hand, the numbers of pixels of the imagers 104a and 104c that shoot red and blue moving pictures, respectively (i.e., the resolutions of the red and blue moving pictures $R_{LH}$ and $B_{LH}$ to be output from the image capturing section 101) are both supposed to be 4,000 horizontal pixels by 2,000 vertical pixels and those red and blue moving pictures $R_{LH}$ and $B_{LH}$ are both supposed to be output at a frame rate of 30 fps.

As can be seen from these numerical values, the green moving picture (which is an exemplary first moving picture) has twice as high a resolution both vertically and horizontally as, and one-fourth as high a frame rate as, the red and blue moving pictures (which are exemplary second and third moving pictures). In this preferred embodiment, a synthetic picture is generated by increasing the frame rate of such a green moving picture while keeping its resolution as it is. That is to say, the green moving picture is processed so that the green synthesized moving picture will have a better subjective image quality than any other synthesized moving picture.

Such processing is carried out because the human visual system is more sensitive by nature to the color green rather than the colors red and blue, and therefore, it is usually preferred that the green synthesized moving picture has the best subjective image quality.

To improve the subjective image quality of a green synthesized moving picture, it would be effective in many cases to shoot a green moving picture with a high resolution and at a low frame rate. For example, in a situation where the subject has little or no motion at all in the image, if a green moving picture is shot with a higher resolution and at a lower frame rate, then the green synthesized moving picture will have a higher resolution, and therefore, a better subjective image quality, than the red or blue synthesized moving picture. Furthermore, if the frame rate of the green moving picture is also increased compared to the red and blue ones, then its subjective image quality would be further improved.

It should be noted that the resolutions (i.e., the numbers of pixels) and the frame rates of the moving pictures representing the respective color components are never limited to the ones described above. For example, if it is known in advance that the image to be shot would have a lot of non-green color components (e.g., blue components in a scene where the image should be captured under sea water or in a swimming pool), then the blue moving picture may be shot with a high resolution and a low frame rate and the red and green moving pictures may be shot with a low resolution and a high frame rate. Then, a generated multi-color moving picture with good subjective image quality can be presented to viewers.

Thus, in this description (including the other preferred embodiments of the present invention to be described later), the green moving picture is supposed to be shot with a high resolution and at a low frame rate and the red and blue moving pictures are supposed to be shot with a low resolution and at a high frame rate, unless stated otherwise.

Also, in this preferred embodiment, the respective frame pictures that form the green moving picture are supposed to be shot (or exposed) at the same time with every fourth frame picture of the red and blue moving pictures. As used herein, if multiple frame pictures are shot at the same time, it means that the pictures representing the respective color components start and finish being exposed simultaneously with each other.

In a situation where multiple color components of a moving picture are shot with three different imagers 104a through 104c, those color components could be misaligned from each other, and the resultant image could get blurred, due to the movement of the subject or a camera shake. To avoid such a situation, those color components are preferably shot at the same time. Nevertheless, those color components do not have to be shot at exactly the same time. This is because even if the respective color components are not shot at exactly the same time, the differences between the pictures representing the respective color components are often hardly appreciable. For example, as long as the exposure start and end times of the multiple color pictures slightly shift from each other but most of their exposure times overlap with each other, their differences are hardly perceptible. In that case, the respective color components may be regarded as shot at the same time.

In the following description, if green, red and blue frame pictures have been shot at the same time, those pictures will be referred to herein as "base frame pictures". On the other hand, if only red and blue frame pictures have been shot at the same time, then those pictures will be referred to herein as "intermediate frame pictures" for the sake of simplicity. FIG. 2 illustrates exemplary base frame pictures and intermediate frame pictures.

The relative spatial locations of the respective pixels of the green moving picture and those of the respective pixels of the red and blue moving pictures are supposed to be known by either adjusting those locations to predetermined ones or determining those locations in advance. In this preferred embodiment, the positions of the three imagers 104a through 104c are supposed to have been adjusted in advance so that each small rectangular area consisting of four green pixels is aligned with a small rectangular area consisting of one red pixel and another small rectangular area consisting of one blue pixel on the subject's image.

The image processing section 106 receives the moving picture data representing the three color components from the image capturing section 101 and stores them in the storage section 107. Every time the data of three consecutive intermediate frame pictures of each of the red and blue moving pictures $R_{LH}$ and $B_{LH}$ and the data of their preceding and succeeding base frame pictures are input to the storage section 107, for example, the image processing section 106 may perform the following processing a number of times.

The motion estimating section 108 receives the data of three consecutive intermediate frame pictures of the red moving picture $R_{LH}$ and the data of their preceding and succeeding base frame pictures from the storage section 107. Then, the motion estimating section 108 calculates the magnitudes of motion of the respective intermediate frame pictures with respect to the two base frame pictures and outputs them as motion information V.

Hereinafter, it will be described with reference to FIG. 3 exactly how the motion estimating section 108 calculates the motion information. In the following example, a small rectangular area is supposed to be defined at regular intervals with respect to respective intermediate frame pictures of the red moving picture $R_{LH}$. As an example, the small rectangular area is supposed to consist of 4 pixels×4 pixels and 1,000×500 small rectangular areas are supposed to be defined in advance with respect to a single red picture.

Figure 3:
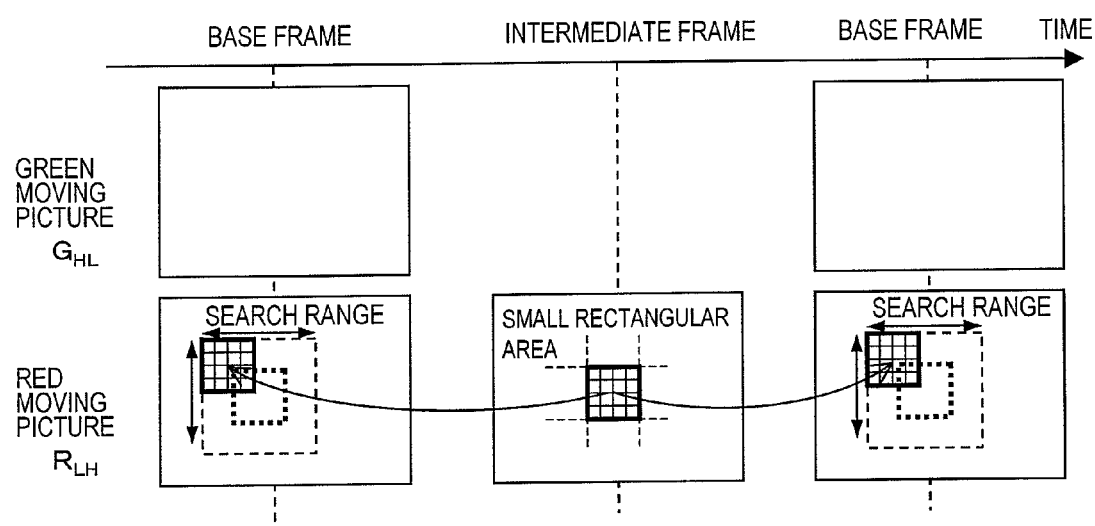
FIG. 3 illustrates the concept of the processing of searching a base frame picture for an area associated with a small rectangular area in an intermediate frame picture.

FIG. 3 illustrates the concept of the processing of searching a base frame picture for an area associated with a small rectangular area in the intermediate frame picture.

The motion estimating section 108 calculates the degrees of similarity between a certain small rectangular area on a single intermediate frame picture and its associated small rectangular areas on its preceding and succeeding base frame pictures and calculates the motion information based on the degrees of similarity thus calculated.

In this preferred embodiment, the sum of absolute differences (SAD) between the pixel values in a small rectangular area on the intermediate frame picture and the ones in its associated small rectangular area on each of two the base frame pictures is calculated as the degree of similarity. Also, the degrees of similarity are calculated between a small rectangular area at a certain coordinate location on the intermediate frame picture and multiple small rectangular areas that fall within a predetermined relative location range on each of the preceding and succeeding base frame pictures, and the coordinate location of one of those small rectangular areas that has resulted in the highest degree of similarity (i.e., the smallest SAD) is obtained as the motion information.

For example, attention may be paid to a particular one of 1,000×500 small rectangular areas on the intermediate frame picture shown in FIG. 3, in which the small rectangular area of interest is indicated by the bold square on the intermediate frame picture. In that case, the motion estimating section 108 may define a search range as covering ±16 pixels both vertically and horizontally around coordinates of a small rectangular area on each base frame picture that is associated with that of the small rectangular area of interest on the intermediate frame picture. In this case, "coordinates of a small rectangular area" are supposed to be coordinates indicating the image center of the small rectangular area. In the example illustrated in FIG. 3, the dotted square on each base frame picture represents the small rectangular area on the base frame picture that is associated with the small rectangular area of interest. Likewise, the dashed square on each base frame picture represents its search range.

Then, the motion estimating section 108 calculates an SAD between the small rectangular area of interest and its counterpart falling within the search range on each of the two base frame pictures. Furthermore, the motion estimating section 108 determines which small rectangular area has resulted in the smallest SAD (which could be indicated by the bold square on the base frame picture) among a huge number of small rectangular areas falling within the search range, calculates the magnitude of motion between the image coordinates of the small rectangular area determined and those of the small rectangular area of interest, and then outputs it as motion information. Such processing of selecting a small rectangular area that has produced a smaller SAD than any of the other numerous small rectangular areas with respect to a certain small rectangular area of interest could be regarded as processing of finding a small rectangular area with the highest degree of similarity. A matching technique like this for searching for an area with the highest degree of similarity by using an SAD as an evaluation value is well known to general public and disclosed in Digital Image Processing edited by Masatoshi Okutomi, pp. 202-204, published by Computer Graphics Arts Society (of Japan), for example, and a detailed description thereof will be omitted herein. Naturally, instead of SAD, the sum of squared differences (SSD) may also be used as the degree of similarity.

The motion estimating section 108 repeatedly performs such processing of calculating the motion information between a single small rectangular area on the intermediate frame picture and its counterpart on each of the two base frame pictures on the 1,000×500 small rectangular areas on each of the three intermediate frame pictures. Then, the motion estimating section 108 outputs the information thus collected as the motion information of the intermediate frame picture with respect to the base frame pictures.

The motion compensating section 109 receives the motion information that has been calculated by the motion estimating section 108 and the first color component (i.e., the green moving picture $G_{HL}$) that is stored in the storage section 107. Then, the motion compensating section 109 generates a green synthetic picture at an arbitrary timing by motion compensation and outputs it as a green synthesized moving picture $G_{HH}$ with a high frame rate.

Figure 4:
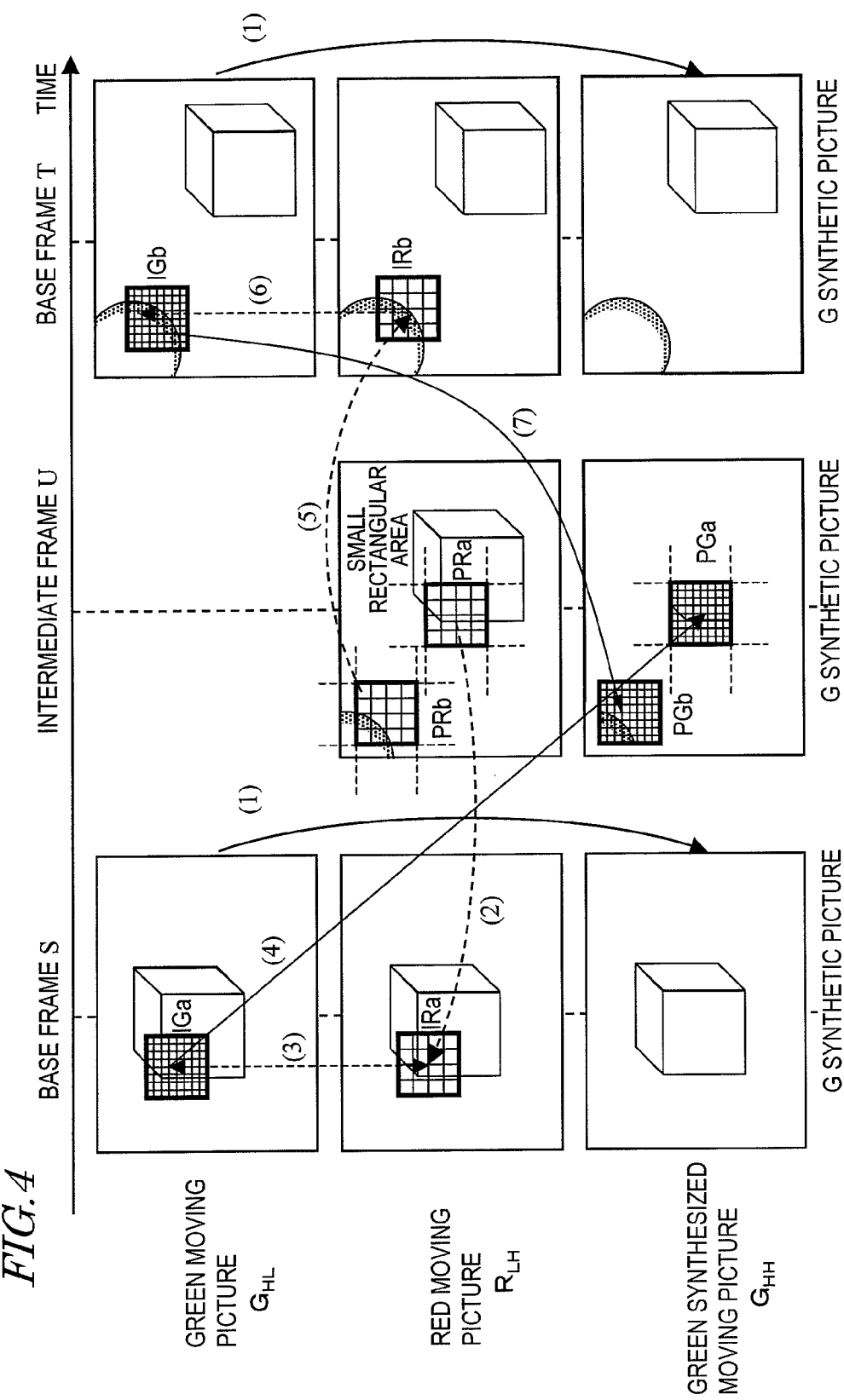
FIG. 4 illustrates conceptually how a motion compensating section 109 generates a green synthesized moving picture $G_{HH}$.

FIG. 4 illustrates conceptually how the motion compensating section 109 generates the green synthesized moving picture $G_{HH}$.

In this preferred embodiment, a green synthetic picture is generated every time a frame picture is presented at the same time as the red moving picture and a green synthesized moving picture consisting of those frame pictures is output.

The motion compensating section 109 copies an existent green moving picture as a green synthetic picture associated with a base frame picture S as indicated by the arrow (1) in FIG. 4.

Hereinafter, it will be described in detail exactly how the motion compensating section 109 generates a green synthetic picture on an intermediate frame picture U. In the following example, intermediate frame pictures U of red and green moving pictures are supposed to be used. Naturally, however, an intermediate frame picture of a blue moving picture may also be used.

First of all, the processing of generating (or synthesizing) a frame picture of a green synthesized moving picture, which is presented at the same time as an intermediate frame picture U of a red moving picture, by using that intermediate frame picture U and a (past) base frame picture S that has been taken before that intermediate frame picture U will be described.

The motion information that has been calculated by the motion estimating section 108 includes the image coordinates of a base frame picture that has the highest degree of similarity with respect to each small rectangular area in an intermediate frame picture U. Thus, the motion compensating section 109 obtains the pixel values of a small rectangular area in a green synthetic picture (identified by PGa in FIG. 4) corresponding to a certain small rectangular area in an intermediate frame picture U of the red moving picture (identified by PRa in FIG. 4) in the following procedure. First, the coordinate location on a base frame picture S (identified by IRa in FIG. 4) corresponding to that small rectangular area PRa in the red moving picture is determined by reference to the motion information as indicated by the arrow (2) in FIG. 4. Next, the coordinate location IGa of a small rectangular area in the green moving picture corresponding to the coordinate location IRa shown in FIG. 4 is determined as indicated by the arrow (3) in FIG. 4. Finally, the pixel values of the small rectangular area at the coordinate location IGa in the green moving picture are copied onto the small rectangular area PGa shown in FIG. 4 in the green synthetic picture as indicated by the arrow (4) shown in FIG. 4.

Next, the processing of generating (or synthesizing) a frame picture of a green synthesized moving picture, which is presented at the same time as an intermediate frame picture U of a red moving picture, by using that intermediate frame picture U and a (future) base frame picture T that has been taken after that intermediate frame picture U will be described.

The motion compensating section 109 obtains the pixel values of a small rectangular area in a green synthetic picture (identified by PGb in FIG. 4) corresponding to a certain small rectangular area in an intermediate frame picture U of the red moving picture (identified by PRb in FIG. 4) in the following procedure. First, the coordinate location in a base frame picture T (identified by IRb in FIG. 4) corresponding to that small rectangular area PRb in the red moving picture is determined by reference to the motion information as indicated by the arrow (5) in FIG. 4. Next, the coordinate location IGb of a small rectangular area in the green moving picture corresponding to the coordinate location IRb shown in FIG. 4 is determined as indicated by the arrow (6) in FIG. 4. Finally, the pixel values of the small rectangular area at the coordinate location IGb in the green moving picture are copied onto the small rectangular area PGb shown in FIG. 4 in the green synthetic picture as indicated by the arrow (7) shown in FIG. 4.

The motion compensating section 109 repeatedly performs the same processing on every small rectangular area on the green synthetic picture, thereby generating a green synthetic picture as the intermediate frame picture U. In the example illustrated in FIG. 4, a green intermediate frame picture is supposed to be generated by using a group of frame pictures that have been taken before the intermediate frame picture and a group of frame pictures that have been taken after the intermediate frame picture. However, this is just an example. Alternatively, the green intermediate frame picture may also be generated by using only a group of frame pictures that have been taken either before or after the intermediate frame picture.

The green synthesized moving picture $G_{HH}$ generated as a result of such operations of the motion compensating section 109 will have a resolution of 8,000 horizontal pixels by 4,000 vertical pixels, which is as high as that of the green moving picture, and a frame rate of 30 fps, which is as high as that of the red and blue moving pictures.

The multi-color image synthesizing section 111 receives the green synthesized moving picture $G_{HH}$ that has been generated by the motion compensating section and the red and blue moving pictures $R_{LH}$ and $B_{LH}$ that are stored in the storage section 107. Then, the multi-color image synthesizing section 111 expands the number of pixels of the moving pictures $R_{LH}$ and $B_{LH}$ up to that of the synthesized moving picture $G_{HH}$ by bicubic interpolation. Thereafter, the multi-color image synthesizing section 111 synthesizes together the interpolated and expanded moving pictures $R_{LH}$ and $B_{LH}$ and the synthesized moving picture $G_{HH}$, thereby generating and outputting a multi-color moving picture $RGB_{HH}$ consisting of the three color components of red, green and blue.

The multi-color moving picture $RGB_{HH}$ generated by the multi-color image synthesizing section 111 will also have a resolution of 8,000 horizontal pixels by 4,000 vertical pixels and a frame rate of 30 fps just like each of the three color components thereof.

The image processing section 106 repeatedly makes its respective sections operate as described above when five frames of the moving picture are supplied from the image capturing section 101 for the first time and every time four frames of the moving picture are newly supplied from the image capturing section 101 from the second time on, thereby continuously outputting the multi-color moving picture RGB$_{HH}$.

In the foregoing description of the operation of the respective sections of the image processing section 106, the motion estimating section 108 and the motion compensating section 109 are supposed to operate sequentially every five frames. However, the present invention is in no way limited to that specific preferred embodiment. Alternatively, the motion estimating section 108 and the motion compensating section 109 may also operate in any other procedure.

Figure 5:
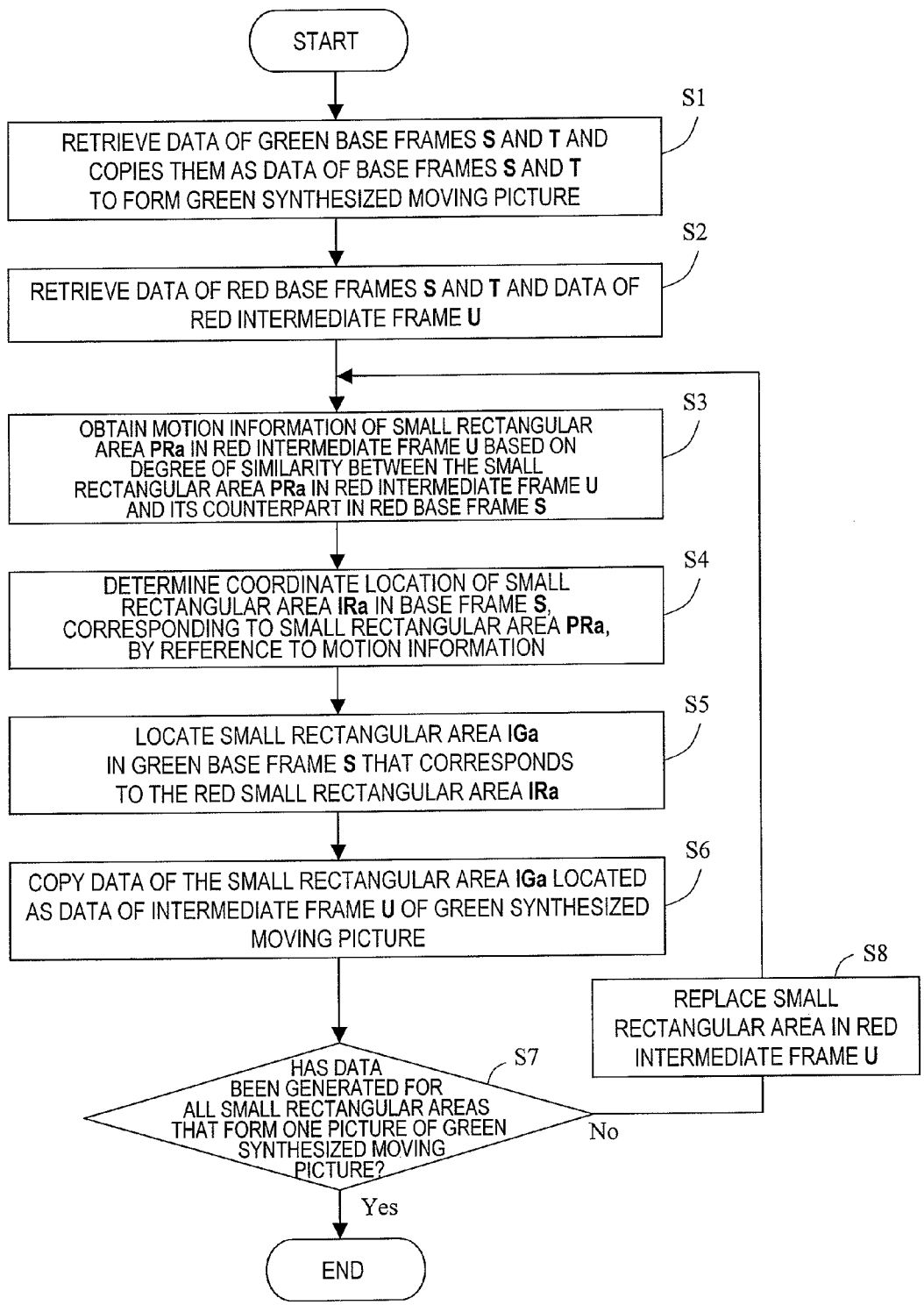
FIG. 5 is a flowchart showing a procedure in which the motion compensating section 109 generates the green synthesized moving picture.

FIG. 5 is a flowchart showing an alternative procedure to make the motion estimating section 108 (that calculates the motion information) and the motion compensating section 109 (that generates a green synthesized moving picture) operate sequentially on a small rectangular area basis. First of all, in Step S1, the motion compensating section 109 retrieves the data of green base frame pictures S and T and copies them as the data of the base frame pictures S and T to form a green synthesized moving picture. Next, in Step S2, the motion estimating section 108 retrieves the data of red base frame pictures S and T and the data of a red intermediate frame picture U, for example.

Next, in Step S3, based on the degree of similarity between the small rectangular area PRa in the red intermediate frame picture U and its counterpart in the red base frame picture S, the motion estimating section 108 obtains the motion information of the small rectangular area PRa in the red intermediate frame picture U.

Subsequently, in Step S4, the motion compensating section 109 determines the coordinate location IRa of the small rectangular area in the base frame picture S, corresponding to the small rectangular area PRa, by reference to the motion information.

Then, in Step S5, the motion compensating section 109 determines the coordinate location IGa of the small rectangular area in the green base frame picture S that corresponds to the small rectangular area (at the coordinate location IRa) in the red moving picture. In this preferred embodiment, during a shooting operation, a small rectangular area consisting of four green pixels is associated with a small rectangular area consisting of only one red pixel and a small rectangular area consisting of only one blue pixel as described above. This processing step S5 is carried out based on that association.

Thereafter, in Step S6, the motion compensating section 109 copies the data of the small rectangular area determined (at the coordinate location IGa) as that of the intermediate frame picture U of the green synthesized moving picture.

Subsequently, in Step S7, the motion compensating section 109 determines whether or not data has been generated for all small rectangular areas that form one picture of the green synthesized moving picture. If the answer is YES, the process ends. Otherwise, the process advances to the processing step S8.

In the processing step S8, the small rectangular area in the red intermediate frame picture U is replaced with another small rectangular area and then the same series of processing steps S3 through S7 are carried out all over again on that small rectangular area.

Figure 6:
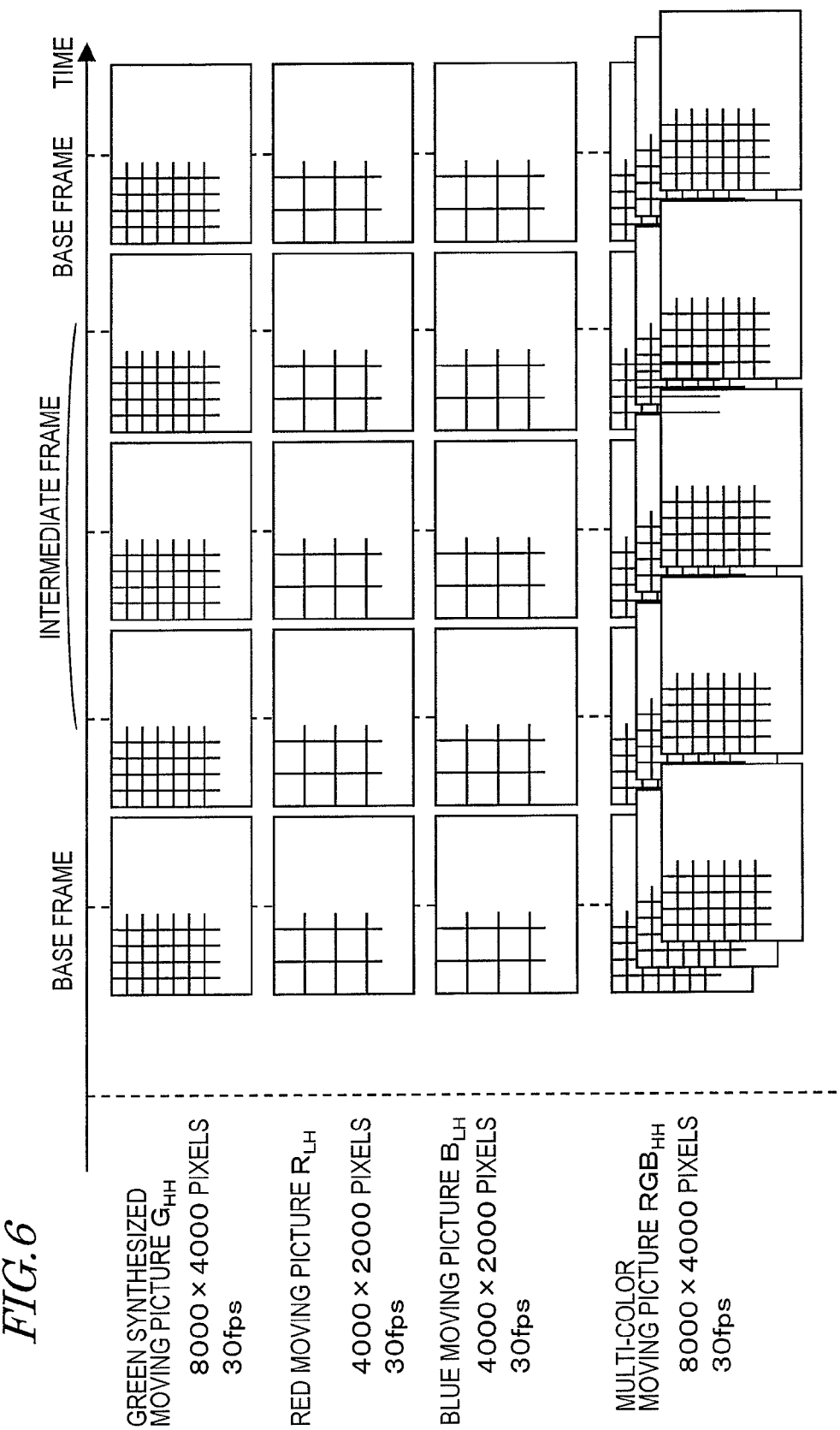
FIG. 6 illustrates an example of a synthesized moving picture and a multi-color moving picture that have been generated as a result of operations of the respective sections of an image processing section 106.

FIG. 6 illustrates an example of a synthesized moving picture and a multi-color moving picture that have been generated as a result of those operations of the respective sections of the image processing section 106. As for the moving pictures representing the respective color components that were obtained by the image capturing section 101, the green moving picture had as high a resolution as 8,000 horizontal pixels by 4,000 vertical pixels and as low a frame rate as 7.5 fps, while the red and blue moving pictures had as low a resolution as 4,000 horizontal pixels by 2,000 vertical pixels and as high a frame rate as 30 fps (see FIG. 2).

On the other hand, in the multi-color moving picture RGB$_{HH}$, the green component had as high a resolution as 8,000 horizontal pixels by 4,000 vertical pixels and as high a frame rate as 30 fps.

As described above, in the multi-color image processing apparatus 1 of this preferred embodiment, the image capturing section 101 shoots a green moving picture representing the first color component with a high resolution and at a low frame rate but shoots red and blue moving pictures representing the second and third color components with a low resolution and at a high frame rate. Then, using the green moving picture and the red or blue moving picture in combination, the image processing section 106 raises the frame rate of the green moving picture and increases the number of pixels of the red and blue moving pictures to that of the green moving picture. In this manner, a multi-color moving picture with a high resolution and a high frame rate can be generated.

Then, even if the read rate of the imagers 104 has an upper limit, the multi-color image processing apparatus 1 can still generate a moving picture so that its resolution and frame rate will exceed what is usually available at that read rate. Suppose the read rate of the imagers 104 has an upper limit of 240,000,000 pixels per second (=8,000 pixels×4,000 pixels×7.5 fps). In that case, the multi-color image processing apparatus 1 can shoot a green moving picture at 8,000 pixels×4,000 pixels×7.5 fps and red and blue moving pictures at 4,000 pixels×2,000 pixels×30 fps and generate a moving picture at 8,000 pixels×4,000 pixels×30 fps based on those moving pictures.

In addition, the multi-color image processing apparatus 1 of this preferred embodiment generates a multi-color moving picture based on the moving pictures representing three different color components and falling within three different wavelength ranges that have been separated from each other by the color component separating section 103. Although light representing a single color component has been split into two by a half mirror in the prior art, the multi-color image processing apparatus 1 of this preferred embodiment can capture a moving picture at a high SNR without decreasing the intensity of the light. As a result, the multi-color moving picture that has been generated based on multiple moving pictures representing respective color components and each having a high SNR also achieves a high SNR.

On top of that, since the human visual system is more sensitive by nature to the color green rather than the color red or blue, the multi-color moving picture would look with better image quality to the viewer's eye if the resolution and frame rate of the green moving picture were set higher than those of the red or blue moving picture.

In the multi-color moving picture RGB$_{HH}$ generated by the method of this preferred embodiment, as for the first color component, a synthesized moving picture that has had its resolution and frame rate both increased by the motion compensating section 109 has been generated. As for the second color component, on the other hand, a picture with a low resolution and a high frame rate has just been interpolated and expanded. That is why if among the multiple color components of the multi-color moving picture to generate, the first color component that should have the highest resolution and highest frame rate is green, then such a multi-color moving picture should look with better image quality to the viewer's eye.

In the preferred embodiment described above, the multi-color image synthesizing section 111 is supposed to generate a multi-color moving picture $RGB_{HH}$ by subjecting the red and blue moving pictures $R_{LH}$ and $B_{LH}$ to the expansion by bicubic interpolation. However, the expansion method by means of interpolation does not have to be the bicubic one but any other expansion method such as a bilinear method may also be adopted as well.

Embodiment 2

The multi-color image processing apparatus 1 of the first preferred embodiment described above receives a green moving picture $G_{HL}$ with a high resolution and a low frame rate and red and blue moving pictures $R_{LH}$ and $B_{LH}$ with a low resolution and a high frame rate and generates a multi-color moving picture $RGB_{HH}$ with a high resolution and a high frame rate. The green moving picture included in the multi-color moving picture $RGB_{HH}$ has been generated by getting the frame rate of the green moving picture $G_{HL}$ increased by the motion compensating section 109.

In the first preferred embodiment, however, as for the red and blue components, their moving pictures $R_{LH}$ and $B_{LH}$ are just interpolated and expanded so that only their number of pixels increases, and their spatial frequency is never raised. That is to say, according to the first preferred embodiment, the red and blue moving pictures $R_{LH}$ and $B_{LH}$ representing the second and third color components never have their spatial resolution increased, strictly speaking.

With that in mind, a multi-color image processing apparatus that is designed to increase the resolution even for the moving pictures representing the second and third color components will be described as a second specific preferred embodiment of the present invention.

Figure 7:
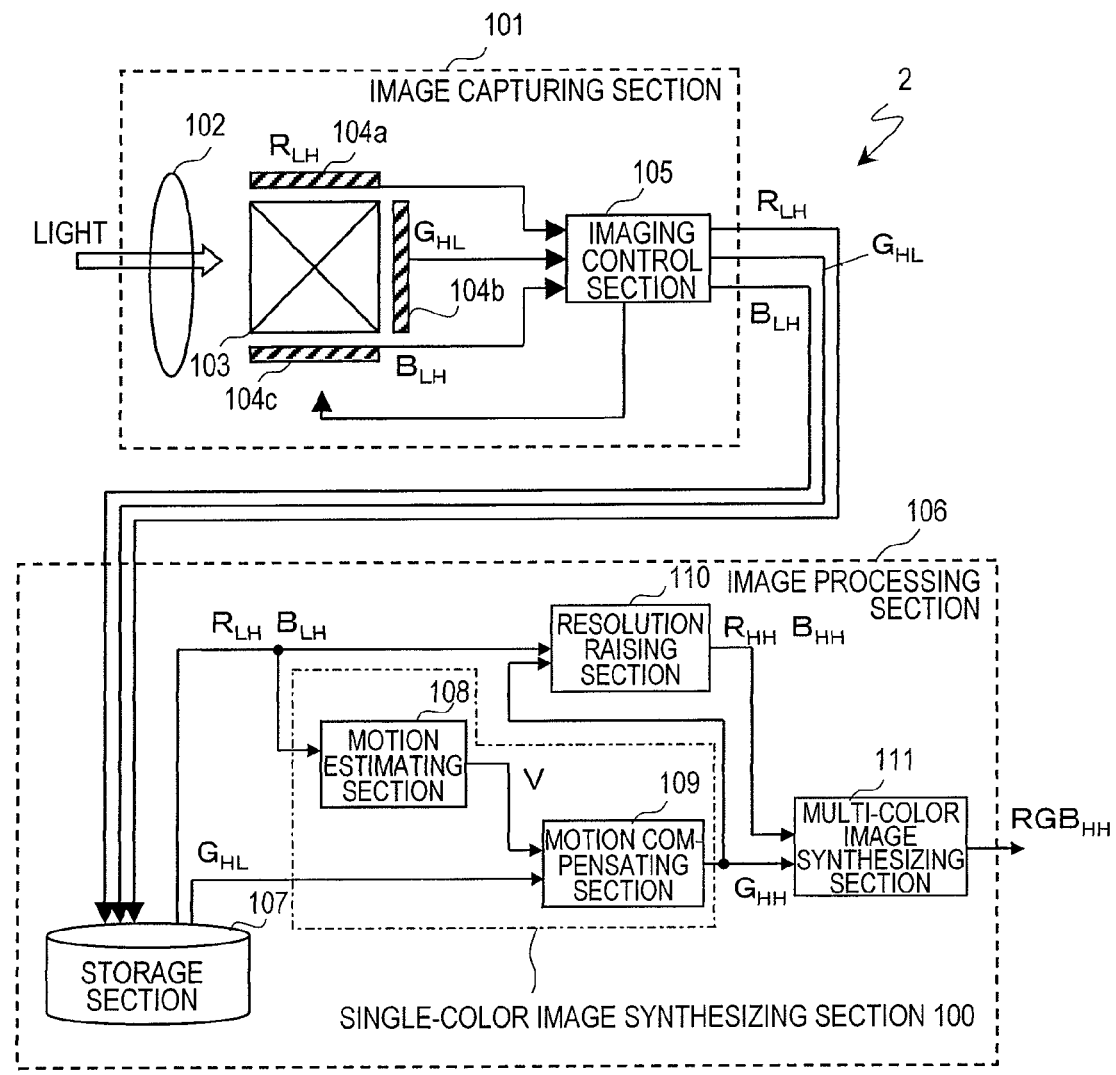
FIG. 7 illustrates a configuration for a multi-color image processing apparatus 2 as a second preferred embodiment of the present invention.

FIG. 7 illustrates a configuration for a multi-color image processing apparatus 2 as a second preferred embodiment of the present invention.

The multi-color image processing apparatus 2 of this preferred embodiment has the same configuration, and operates in the same way, as the counterpart 1 of the first preferred embodiment (see FIG. 1) except that a resolution raising section 110 is newly provided for this apparatus 2 and that the multi-color image synthesizing section 111 performs a different kind of processing.

Specifically, the resolution raising section 110 of this preferred embodiment receives the data of the red and blue moving pictures $R_{LH}$ and $B_{LH}$ that are stored in the storage section 107 and the data of the green synthesized moving picture $G_{HH}$ that has been generated by the motion compensating section 109, and raises the resolution of respective frame pictures of the red and blue moving pictures $R_{LH}$ and $B_{LH}$, thereby generating and outputting synthesized moving pictures $R_{HH}$ and $B_{HH}$ representing the red and blue components, respectively.

Also, the multi-color image synthesizing section 111 of this preferred embodiment receives the data of the green synthesized moving picture $G_{HH}$ that has been generated by the motion compensating section 109 and the data of the red and blue synthesized moving pictures $R_{HH}$ and $B_{HH}$ that have been generated by the resolution raising section 111 and generates and outputs a multi-color moving picture $RGB_{HH}$ consisting of the three color components of red, green and blue.

Hereinafter, it will be described how the multi-color image processing apparatus 2 of this preferred embodiment operates.

The image capturing section 101, the storage section 107, the motion estimating section 108 and the motion compensating section 109 of this multi-color image processing apparatus 2 operate in the same way as their counterparts of the multi-color image processing apparatus 1 of the first preferred embodiment. That is to say, the image capturing section 101 sequentially shoots green, red and blue moving pictures $G_{HL}$, $R_{LH}$ and $B_{LH}$ and stores the data of those moving pictures in the storage section 107. It should be noted that the green, red and blue moving pictures $G_{HL}$, $R_{LH}$ and $B_{LH}$ of this preferred embodiment have the same resolutions and same frame rates as what has already been described for the first preferred embodiment.

Every time the data of three intermediate frame pictures and that of their preceding and succeeding base frame pictures are input to the storage section 107, the motion estimating section 108 calculates the motion information V of the respective intermediate frame pictures based on the red and blue moving pictures $R_{LH}$ and $B_{LH}$. Then, the motion compensating section 109 receives the green moving picture $G_{HL}$ and the motion information V and generates and outputs a green synthesized moving picture $G_{HH}$.

The resolution raising section 110 receives the data of the red and blue moving pictures $R_{LH}$ and $B_{LH}$ that are stored in the storage section 107 and the data of the green synthesized moving picture $G_{HH}$ that has been generated by the motion compensating section 109, and raises the resolution of respective frame pictures of the red and blue moving pictures $R_{LH}$ and $B_{LH}$ by reference to the information about the green synthesized moving picture $G_{HH}$, thereby outputting respective moving pictures that have had their resolution raised as red and blue synthesized moving pictures $R_{HH}$ and $B_{HH}$.

The red and blue synthesized moving pictures $R_{HH}$ and $B_{HH}$ that have been generated in this manner by the resolution raising section 110 have a resolution of 8,000 horizontal pixels by 4,000 vertical pixels and a frame rate of 30 fps.

Hereinafter, it will be described exactly how the resolution raising section 110 raises the resolution of the red and blue moving pictures $R_{LH}$ and $B_{LH}$ by reference to the information about the green synthesized moving picture $G_{HH}$.

Portion (a) of FIG. 8 illustrates the arrangements of pixels in the red and blue moving pictures $R_{LH}$ and $B_{LH}$, the green synthesized moving picture $G_{HH}$ and the red and blue synthesized moving pictures $R_{HH}$ and $B_{HH}$ in the same frame (i.e., at the same timing). Portion (b) of FIG. 8 illustrates some of pixels that form the respective moving pictures on a larger scale. The resolution of the green, red and blue synthesized moving pictures $G_{HH}$, $R_{HH}$ and $B_{HH}$ is twice as high as that of the red and blue moving pictures $R_{LH}$ and $B_{LH}$ both vertically and horizontally alike. That is why a certain pixel of the red and blue moving pictures $R_{LH}$ and $B_{LH}$ is present at the same location as its associated four pixels of the green, red and blue synthesized moving picture $G_{HH}$, $R_{HH}$ and $B_{HH}$.

Suppose the pixel coordinates (xl, yl) of the red and blue moving pictures $R_{LH}$ and $B_{LH}$ have pixel values of $IR_{LH}$ (xl, yl) and $IB_{LH}$ (xl, yl), respectively, and the pixel coordinates (xh, yh) of their associated four pixels of the green synthesized moving picture $G_{HH}$ have a pixel value of $IG_{HH}$ (xh, yh). In that case, the pixel values $IR_{HH}$ (xh, yh) and $IB_{HH}$ (xh, yh) of the pixel coordinates (xh, yh) of the four pixels of the red and blue synthesized moving pictures $R_{HH}$ and $B_{HH}$ are calculated by the following Equations (1):

$$IR_{HH}(xh, yh) = w(xh, yh)IR_{LH}(xl, yl) \quad (1)$$

$$IB_{HH}(xh, yh) = w(xh, yh)IB_{LH}(xl, yl)$$

$$w(xh, yh) = \frac{IG_{HH}(xh, yh)}{\overline{IG}_{HH}}$$

$$\overline{IG}_{HH} = \frac{1}{n}\sum_{yh}\sum_{xh} IG_{HH}(xh, yh), (n = 4)$$

In the third one of these Equations (1), the denominator on the right side represents the average pixel value of the four neighboring pixels of the green synthetic picture and the numerator represents the pixel value of each single pixel. On the left side, w (xh, yh) represents the distribution of high frequency components of the respective pixel values of the four neighboring pixels in the green synthetic picture. On the other hand, according to the first and second ones of Equations (1), the distribution of those high frequency components in the green synthetic picture is multiplied by certain pixel values of the red and blue pictures, thereby calculating the pixel values of the red and blue synthetic pictures. That is to say, as for the associated four pixels, the pixel values $IR_{HH}$ (xh, yh) and $IB_{HH}$ (xh, yh) that have the same distribution of high frequency components are calculated for the green, red and blue synthetic pictures.

That is why if the subject has such color components in which the high frequency component distribution of the color green is similar to that of the colors red and blue (which is typically the case if the subject is monotone (or grey)), then the red and blue synthesized moving pictures $R_{HH}$ and $B_{HH}$ calculated by Equations (1) will include high frequency components that are not included in the red or blue moving picture $R_{LH}$ or $B_{LH}$. In other words, the red and blue synthesized moving pictures $R_{HH}$ and $B_{HH}$ are pictures obtained by raising the resolution of the red and blue moving pictures $R_{LH}$ and $B_{LH}$. Portion (c) of FIG. 8 illustrates groups of pixels that have had their resolution raised and that correspond to the pixels of the red and blue moving pictures shown in portion (b) of FIG. 8.

The multi-color image synthesizing section 111 receives the green synthesized moving picture $G_{HH}$ that has been generated by the motion compensating section and the red and blue synthesized moving pictures $R_{HH}$ and $B_{HH}$ that have been generated by the resolution raising section 111 and generates and outputs a multi-color moving picture $RGB_{HH}$ consisting of the three color components of red, green and blue. The multi-color moving picture that has been generated in this manner by the multi-color image synthesizing section 111 has a resolution of 8,000 horizontal pixels by 4,000 vertical pixels and a frame rate of 30 fps for each of the green, red and blue components.

The image processing section 106 repeatedly makes its respective sections operate as described above when five frames of the moving picture are supplied from the image capturing section 101 for the first time and every time four frames of the moving picture are newly supplied from the image capturing section 101 from the second time on, thereby continuously outputting the multi-color moving picture $RGB_{HH}$.

FIG. 9 illustrates an example of a synthesized moving picture and a multi-color moving picture that have been generated as a result of those operations of the respective sections of the image processing section 106. As for the moving pictures representing the respective color components that were obtained by the image capturing section 101, the green moving picture had as high a resolution as 8,000 horizontal pixels by 4,000 vertical pixels and as low a frame rate as 7.5 fps, while the red and blue moving pictures had as low a resolution as 4,000 horizontal pixels by 2,000 vertical pixels and as high a frame rate as 30 fps (see FIG. 2).

On the other hand, each of the three synthesized moving pictures had as high a resolution as 8,000 horizontal pixels by 4,000 vertical pixels and as high a frame rate as 30 fps. By combining these synthesized moving pictures with each other, the multi-color image synthesizing section 111 generates a color moving picture $RGB_{HH}$ that has both a high resolution and a high frame rate alike.

As described above, the multi-color image processing apparatus 2 of this preferred embodiment can generate a multi-color moving picture with the resolution of the red and blue components, representing the second and third color components, raised. Thus, even if the read rate of the imagers 104 has an upper limit as in the first preferred embodiment described above, the multi-color image processing apparatus 2 can still generate a moving picture so that its resolution and frame rate will exceed what is usually available at that read rate. In addition, as in the first preferred embodiment described above, the multi-color image processing apparatus of this preferred embodiment can also capture a moving picture at a high SNR without decreasing the intensity of the light. As a result, the multi-color moving picture also achieves a high SNR.

In the preferred embodiment described above, the resolution raising section 110 generates the red and blue synthesized moving pictures representing the second and third color components by Equations (1). However, the processing represented by those Equations (1) is just an example. Alternatively, the processing may also be carried out by another mathematical equation as long as the resolution of the red and blue moving pictures can be raised by reference to the information included in the green synthesized moving picture representing the first color component.

For example, a degree of correlation may be calculated between the green synthetic picture and its neighboring area on the red and blue pictures and the resolution raising processing may be carried out to varying extents according to that degree of correlation. Specifically, the red and blue synthetic pictures may also be calculated by the following Equations (2):

$$IR_{HH}(xh, yh) = (1 + wlr(xl, yl)wh(xh, yh))IR_{LH}(xl, yl) \quad (2)$$

$$IB_{HH}(xh, yh) = (1 + wlb(xl, yl)wh(xh, yh))IB_{LH}(xl, yl)$$

$$wh(xh, yh) = \frac{IG_{HH}(xh, yh) - \overline{IG}_{HH}}{\overline{IG}_{HH}}$$

$$\overline{IG}_{HH} = \frac{1}{n}\sum_{yh}\sum_{xh} IG_{HH}(xh, yh), (n = 4)$$

$$wlr(xl, yl) = \frac{\sum_{yl}\sum_{xl} IG_{LH}(xl, yl)IR_{LH}(xl, yl)}{\sqrt{\sum_{yl}\sum_{xl} IG_{LH}(xl, yl)^2 \sum_{yl}\sum_{xl} IR_{LH}(xl, yl)^2}}$$

-continued $$wlb(xl, yl) = \frac{\sum_{yl}\sum_{xl} IG_{LH}(xl, yl)IB_{LH}(xl, yl)}{\sqrt{\sum_{yl}\sum_{xl} IG_{LH}(xl, yl)^2 \sum_{yl}\sum_{xl} IB_{LH}(xl, yl)^2}}$$

$$IG_{LH}(xl, yl) = \frac{1}{n}\sum_{yh}\sum_{xh} IG_{HH}(xh, yh), (n = 4)$$

According to these Equations (2), the normalized degree of cross-correlation wlr is calculated between the pixel value $IG_{LH}$ of a low-resolution picture, which is obtained by calculating the average of the four pixels of the green synthetic picture, and the pixel value $IG_{LH}$ of the red picture and used as a weight to be added to Equations (1). The same can be said about the blue picture, too.

In other words, according to these Equations (2), the stronger the correlation between the green synthetic picture and the red picture, the higher the proportion of the high frequency component distribution of the color green to be added to that of the color red. Conversely, the fainter the correlation between them, the lower the proportion of the high frequency component distribution of the color green to be added to that of the color red.

With Equations (1) adopted, even if there is only low correlation between the color green and the color red or blue (e.g., if the subject is green or red), the high frequency components that should be absent from the red or blue synthesized moving picture could be added to it or the resolution of the red or blue synthesized moving picture could not be raised, which is a problem.

If Equations (2) are adopted, on the other hand, the proportion of the high frequency component distribution to add is adjusted according to the degree of correlation between the colors green and red or between the colors green and blue, thus letting such problems rarely happen. As a result, even if pictures with varied resolutions have been entered, the multicolor moving picture generated can still look with an increased resolution to the viewer's eye.

Likewise, the red and blue synthetic pictures can also be obtained by the following Equations (3) instead of Equations (2):

$$IR_{HH}(xh, yh) = (1 + wlr(xl, yl)wh(xh, yh))IR_{LH}(xl, yl) \quad (3)$$

$$IB_{HH}(xh, yh) = (1 + wlb(xl, yl)wh(xh, yh))IB_{LH}(xl, yl)$$

$$wh(xh, yh) = \frac{IG_{HH}(xh, yh) - \overline{IG_{HH}}}{\overline{IG_{HH}}}$$

$$\overline{IG_{HH}} = \frac{1}{n}\sum_{yh}\sum_{xh} IG_{HH}(xh, yh), (n = 4)$$

$$wlr(xl, yl) = \frac{\sum_{yl}\sum_{xl}(IG_{LH}(xl, yl) - \overline{IG_{LH}})(IR_{LH}(xl, yl) - \overline{IR_{LH}})}{\sqrt{\sum_{yl}\sum_{xl}(IG_{LH}(xl, yl) - \overline{IG_{LH}})^2}\sqrt{\sum_{yl}\sum_{xl}(IR_{LH}(xl, yl) - \overline{IR_{LH}})^2}}$$

-continued $$wlb(xl, yl) = \frac{\sum_{yl}\sum_{xl}(IG_{LH}(xl, yl) - \overline{IG_{LH}})(IB_{LH}(xl, yl) - \overline{IB_{LH}})}{\sqrt{\sum_{yl}\sum_{xl}(IG_{LH}(xl, yl) - \overline{IG_{LH}})^2}\sqrt{\sum_{yl}\sum_{xl}(IR_{LH}(xl, yl) - \overline{IR_{LH}})^2}}$$

$$IG_{LH}(xl, yl) = \frac{1}{n}\sum_{yh}\sum_{xh} IG_{HH}(xh, yh), (n = 4)$$

$$\overline{IG_{LH}} = \frac{1}{n}\sum_{yl}\sum_{xl} IG_{LH}(xl, yl),$$

$$\overline{IR_{LH}} = \frac{1}{m}\sum_{yl}\sum_{xl} IR_{LH}(xl, yl),$$

$$\overline{IB_{LH}} = \frac{1}{m}\sum_{yl}\sum_{xl} IB_{LH}(xl, yl), (m = 9)$$

Equations (2) use a normalized cross correlation as a weight wlr representing the degree of correlation between the low frequency components of the green synthetic picture and those of the red moving picture. However, these Equations (3) use a correlation coefficient instead of the normalized cross correlation. According to Equations (2), the closer to one the value of the normalized cross correlation, the stronger the correlation. On the other hand, the closer to zero the value of the normalized cross correlation, the weaker the correlation. Meanwhile, according to Equations (3), the closer to −1 or 1 the value of the correlation coefficient, the stronger the correlation. On the other hand, the closer to zero the value of the correlation coefficient, the weaker the correlation. Also, if the correlation coefficient of Equations (3) is positive (or negative), then it will be said there is a positive (or negative) correlation. By adopting these Equations (3), if there is a strong negative correlation between the low frequency components of the green synthetic picture and those of the red moving picture, then synthesized moving pictures $IR_{HH}$ and $IB_{HH}$ will be generated so that there will be a strong negative correlation between their high frequency components. As a result, in a situation where there is a strong negative correlation between the colors green and red and between the colors green and blue, the weight wlr will be close to zero and the resolution will not be raised if Equations (2) are adopted. But if Equations (3) are adopted, there will also be additional high frequency components with a strong negative correlation depending on the value of the correlation. As a result, a synthesized moving picture with even higher resolution can be obtained.

In Equations (2) and (3), according to the magnitude and the sign of wlr and wlb representing the degree of correlation between the distribution of the low-resolution pixel values $IG_{LH}$ of the green synthetic picture and that of the low-resolution pixel values $IR_{LH}$ or $IB_{LH}$ of the red or blue picture in the neighboring pixel region (i.e., the degree of their spatial correlation), it is determined how much of the high frequency components wh included in the green synthetic picture should be added to the red and blue synthetic pictures. On the other hand, if the correlation decreases (i.e., if wlr and wlb go closer to zero), then the pixel values $IR_{HH}$ and $IB_{HH}$ of the red and blue synthetic pictures get closer to the pixel values $IR_{LH}$ and $IB_{LH}$ of the red and blue pictures. As a result, the $IR_{HH}$ and $IB_{HH}$ values become as if the pictures were expanded by selecting most neighboring pixels to $IR_{LH}$ and $IB_{LH}$.

However, a higher subjective image quality would be achieved by bicubic interpolation based expansion rather than by such expansion through the selection of most neighboring pixels. Thus, the following Equations (4), obtained by modifying Equations (3) so that processing similar to the expansion by bicubic interpolation will be carried out if there is a weak correlation, may also be used. According to Equations (4), the weaker the correlation (i.e., the closer to zero wlr and wlb get), the closer to $IR_B$ and $IB_B$ (that are obtained by subjecting $IR_{LH}$ and $IB_{LH}$ to the bicubic interpolation based expansion) the resultant pixel values will be. As a result, the subjective image quality will be improved compared to the situation where Equations (3) are adopted.

$$IR_{HH}(xh, yh) = \begin{cases} wlr(xl, yl)IR_P(xh, yh) + \\ (1 - wlr(xl, yl))IR_B(xh, yh), & wlr \geq 0 \\ -wlr(xl, yl)IR_M(xh, yh) + \\ (1 + wlr(xl, yl))IR_B(xh, yh), & wlr < 0 \end{cases} \quad (4)$$

$$IB_{HH}(xh, yh) = \begin{cases} wlb(xl, yl)IB_P(xh, yh) + \\ (1 - wlb(xl, yl))IB_B(xh, yh), & wlr \geq 0 \\ -wlb(xl, yl)IB_M(xh, yh) + \\ (1 + wlb(xl, yl))IB_B(xh, yh), & wlr < 0 \end{cases}$$

$$IR_P(xh, yh) = (1 + wh(xh, yh))IR_{LH}(xl, yl)$$

$$IR_M(xh, yh) = (1 - wh(xh, yh))IR_{LH}(xl, yl)$$

$$IB_P(xh, yh) = (1 + wh(xh, yh))IR_{LH}(xl, yl)$$

$$IB_M(xh, yh) = (1 - wh(xh, yh))IR_{LH}(xl, yl)$$

$$IR_B(xh, yh) = f_{Bicubic}(IR_{LH}, xh, yh)$$

$$IB_B(xh, yh) = f_{Bicubic}(IB_{LH}, xh, yh)$$

$$wh(xh, yh) = \frac{IG_{HH}(xh, yh) - \overline{IG}_{HH}}{\overline{IG}_{HH}}$$

$$\overline{IG}_{HH} = \frac{1}{n}\sum_{yh}\sum_{xh} IG_{HH}(xh, yh), \ (n = 4)$$

$$wlr(xl, yl) = \frac{\sum_{yl}\sum_{xl}(IG_{LH}(xl, yl) - \overline{IG}_{LH})(IR_{LH}(xl, yl) - \overline{IR}_{LH})}{\sqrt{\sum_{yl}\sum_{xl}(IG_{LH}(xl, yl) - \overline{IG}_{LH})^2}\sqrt{\sum_{yl}\sum_{xl}(IR_{LH}(xl, yl) - \overline{IR}_{LH})^2}}$$

$$wlb(xl, yl) = \frac{\sum_{yl}\sum_{xl}(IG_{LH}(xl, yl) - \overline{IG}_{LH})(IB_{LH}(xl, yl) - \overline{IR}_{LH})}{\sqrt{\sum_{yl}\sum_{xl}(IG_{LH}(xl, yl) - \overline{IG}_{LH})^2}\sqrt{\sum_{yl}\sum_{xl}(IR_{LH}(xl, yl) - \overline{IR}_{LH})^2}}$$

$$IG_{LH}(xl, yl) = \frac{1}{n}\sum_{yh}\sum_{xh} IG_{HH}(xh, yh), \ (n = 4)$$

$$\overline{IG}_{LH} = \frac{1}{m}\sum_{yl}\sum_{xl} IG_{LH}(xl, yl),$$

$$\overline{IR}_{LH} = \frac{1}{m}\sum_{yl}\sum_{xl} IR_{LH}(xl, yl),$$

-continued $$\overline{IB}_{LH} = \frac{1}{m}\sum_{yl}\sum_{xl} IB_{LH}(xl, yl), \ (m = 9)$$

$R_{HH}$ and $B_{HH}$ with the raised resolution can be generated by performing the processing represented by these Equations (1) through (4) not just because the high frequency components of $G_{HH}$ are superposed but also because even if the red and blue moving pictures $R_{LH}$ and $B_{LH}$ had alias components, those alias components can be reduced by performing the processing represented by Equations (1) through (4).

For example, if moving pictures representing respective color components are shot with a camera that uses the same optical system to do that and if low-resolution red and blue moving pictures $R_{LH}$ and $B_{LH}$ are generated by performing hardware binning processing (which will be described in detail later for a fourth specific preferred embodiment of the present invention) on the imagers, then the red and blue moving pictures $R_{LH}$ and $B_{LH}$ will include alias components. Even if red and blue moving pictures $R_{LH}$ and $B_{LH}$ with such alias components are just received and if $G_{HH}$ is simply superposed on them, the influence of aliasing could not be reduced. On the other hand, in the processing represented by Equations (1) through (4), the bar over "$IG_{HH}$" indicates the average of $IG_{HH}$ and is equivalent to performing binning processing on R or B. That is why the average of $IG_{HH}$ also includes alias components. The ratio of this average of $IG_{HH}$ to $IG_{HH}$ itself is wh, and $IR_{HH}$ and $IB_{HH}$ are obtained by multiplying $IR_{LH}$ and $IB_{LH}$ by wh.

In this case, if there is a very strong correlation between the respective colors (e.g., in the case of a monotone shaded image), then $R_{LH}$, $B_{LH}$ and the average of $IG_{HH}$ will have alias components with the same frequency components. That is why $IR_{HH}$ and $IB_{HH}$, obtained by multiplying $IR_{LH}$ and $IB_{LH}$ by wh that is the ratio of the average of $IG_{HH}$ with the alias components to $IG_{HH}$ with high resolution, will either have no alias components at all or be affected by those components to a lesser degree.

In Equations (2) and (3) mentioned above, the weight wlr can be used as a coefficient for adjusting the degree of resolution raising processing according to the degree of correlation between the spatial distribution of the red picture representing the second color component and that of the green picture representing the first color component (i.e., the degree of spatial correlation). However, the same effect can also be achieved even by using, as an alternative weight, the degree of correlation between the temporal distributions of moving pictures representing two color components (i.e., the degree of temporal correlation) instead of that weight wlr.

To evaluate a moving picture with a high resolution and a high frame rate that was generated by the multi-color image processing apparatus 2 of this preferred embodiment, the present inventors carried out experiments to confirm its effects. FIG. 17 shows the results of those experiments that were performed using the multi-color image processing apparatus 2 of this preferred embodiment.

The experiments were carried out in the following manner. First of all, an original picture $RGB_{TRUE}$ with a high resolution and a high frame rate was provided and a green picture $G_{HL}$ with a high resolution and a low frame rate and red and blue moving pictures $R_{LH}$ and $B_{LH}$ with a low resolution and a high frame rate were generated from the intended picture $RGB_{TRUE}$ and used as input pictures. Then, based on those input pictures, a multi-color moving picture $RGB_{HH}$ was generated using the multi-color image processing apparatus 2 of this preferred embodiment.

In this case, the closer to the intended picture $RGB_{TRUE}$ with a high resolution and a high frame rate the multi-color moving picture $RGB_{HH}$ generated, the more effectively the apparatus of this preferred embodiment can generate a moving picture with a high resolution and a high frame rate. Thus, supposing the intended picture $RGB_{TRUE}$ as the answer, the PSNR (peaks signal to noise ratio) of the multi-color moving picture $RGB_{HH}$ generated to the intended picture $RGB_{TRUE}$ was used as an evaluation index. For the purpose of comparison, $R_{LH}$, $G_{LH}$ and $B_{LH}$ representing the three color components with a low resolution and a high frame rate were used as input pictures and expanded by bicubic interpolation and their PSNR was also calculated.

The experiments were carried out under the following conditions. Specifically, the intended picture $RGB_{TRUE}$ and the multi-color moving picture $RGB_{HH}$ were supposed to consist of 720 horizontal pixels×480 vertical pixels×60 fps, the green picture $G_{HL}$ as an input picture was supposed to consist of 720 horizontal pixels×480 vertical pixels×3.75 fps, and the red and blue moving pictures $R_{LH}$ and $B_{LH}$ as input pictures were supposed to consist of 180 horizontal pixels×120 vertical pixels×60 fps. The rectangular area used by the motion estimating section 108 to estimate the motion between an intermediate frame and a base frame was supposed to consist of 3 pixels by 3 pixels. And the resolution raising section 110 was supposed to use Equations (3).

In FIG. 17, the bars labeled as "Embodiment 2 of this invention" represent the PSNRs of multi-color moving pictures that were generated by the multi-color image processing apparatus 2 of this preferred embodiment. For the purpose of comparison, the PSNRs of pictures that were expanded by bicubic interpolation are also shown in FIG. 17 by bars labeled as "Bicubic".

The results shown in FIG. 17 reveal that in a lot of instances, the multi-color moving picture generated by the multi-color image processing apparatus 2 of this preferred embodiment had a higher PSNR than what was generated by bicubic interpolation. That is to say, it can be confirmed that by using the multi-color image processing apparatus 2 of this preferred embodiment, a moving picture with a high resolution and a high frame rate, which was closer to the intended picture, could be generated.

Embodiment 3

The multi-color image processing apparatus 1 of the first preferred embodiment described above estimates a motion between frame pictures of a moving picture representing a second color component and generates a multi-color moving picture by raising the frame rate of the moving picture representing a first color component using that motion. On the other hand, the multi-color image processing apparatus 2 of the second preferred embodiment described above assumes that there is a correlation between the respective high frequency components of pictures representing the first and second color components and generates a multi-color moving picture with the resolution of the moving picture representing the second color component raised so that the high frequency components of the synthesized moving pictures representing the first and second color components have a stronger correlation between them.

And a multi-color image processing apparatus as a third specific preferred embodiment of the present invention also supposes there is a correlation between the respective high frequency components of the pictures representing the first and second color components as in the second preferred embodiment described above, and performs the following processing. Specifically, the multi-color image processing apparatus of this third preferred embodiment estimates not only a motion between the frame pictures of the moving picture representing the second color component but also the synthesized moving picture representing the second color component at the same time so that there will be a stronger correlation between the respective high frequency components of the moving picture representing the first color component and the synthesized moving picture representing the second color component that are associated with each other by the motion between the frame pictures. As a result, the resolution of the moving picture representing the second color component can be raised and the motion between the frame pictures can be estimated more accurately as well.

FIG. 10 illustrates a configuration for a multi-color image processing apparatus 3 as a third preferred embodiment of the present invention.

The multi-color image processing apparatus 3 has the same configuration, and operates in the same way, as the counterpart 1 of the first preferred embodiment described above (see FIG. 1) except the functions of the motion estimating section 108 and the multi-color image synthesizing section 111.

Specifically, the motion estimating section 108 of this preferred embodiment receives the data of the red, blue and green moving pictures $R_{LH}$, $B_{LH}$ and $G_{HL}$ that are stored in the storage section 107, calculates the motion information V, and raises the resolution of the respective frame pictures of the red and blue moving pictures $R_{LH}$ and $B_{LH}$, thereby generating and outputting red and blue synthesized moving pictures $R_{HH}$ and $B_{HH}$.

Also, the multi-color image synthesizing section 111 of this preferred embodiment receives the data of the red and blue synthesized moving pictures $R_{HH}$ and $B_{HH}$ that have been generated by the motion estimating section 108 and the data of the green synthesized moving picture $G_{HH}$ that has been generated by the motion compensating section 109 and generates and outputs a multi-color moving picture $RGB_{HH}$ consisting of the three color components of red, green and blue.

Hereinafter, it will be described how the multi-color image processing apparatus 3 of this preferred embodiment operates.

The image capturing section 101, the storage section 107, and the motion compensating section 109 of this preferred embodiment operate in the same way as their counterparts of the first or second preferred embodiment. That is to say, the image capturing section 101 sequentially shoots green, red and blue moving pictures $G_{HL}$, $R_{LH}$ and $B_{LH}$ and stores them in the storage section 107. Also, in this preferred embodiment, the green, red and blue moving pictures $G_{HL}$, $R_{LH}$ and $B_{LH}$ have the same resolutions and same frame rates as what has already been described for the first or second preferred embodiment.

The motion estimating section 108 receives the data of three consecutive intermediate frame pictures of each of the red and blue moving pictures $R_{LH}$ and $B_{LH}$ that are stored in the storage section 107, the data of their preceding and succeeding base frame pictures, and the data of two base frame pictures of their associated green moving picture $G_{HL}$, calculates the motions to the two base frame pictures with respect to each intermediate frame picture, and outputs the motions as the motion information V. In parallel with this processing, the motion estimating section 108 generates and outputs red and blue synthesized moving pictures $R_{HH}$ and $B_{HH}$ with a raised resolution.

Also, the motion estimating section 108 calculates the degrees of similarity between a certain small rectangular area in one intermediate frame picture and a number of small rectangular areas falling within the search range defined on each of the preceding and succeeding base frame pictures, and determines the relative location of the small rectangular area with the highest degree of similarity as the motion information.

In the first preferred embodiment described above, the SAD of the luminance values of a red moving picture $R_{LH}$ with a low resolution is used to represent the degree of similarity between small rectangular areas. On the other hand, according to this preferred embodiment, the small rectangular areas of the red moving picture $R_{LH}$ have their resolution raised by using the green moving picture $G_{HL}$ and the SAD of the luminance values of those small rectangular areas with the raised resolution is used as an evaluation value.

Hereinafter, it will be described with reference to FIG. 11 exactly how the motion estimating section 108 calculates the motion information V and the red and blue synthesized moving pictures $R_{HH}$ and $B_{HH}$.

FIG. 11 illustrates conceptually how the motion compensating section 109 generates the red synthesized moving picture $R_{HH}$.

The motion estimating section 108 receives the data of three consecutive intermediate frame pictures of the red moving picture $R_{LH}$ that are stored in the storage section 107, the data of their preceding and succeeding base frame pictures, and the data of two base frame pictures of their associated green moving picture $G_{HL}$. Then, as indicated by the arrow (1) in FIG. 11, using the respective base frame pictures of the red and green moving pictures $R_{LH}$ and $G_{HL}$, the motion estimating section 108 generates a base frame picture of a red synthesized moving picture $R_{HH}$ with a raised resolution. Just like the resolution raising section 110 of the second preferred embodiment described above, the resolution of the red moving picture may be raised by using Equations (1) through (4).

Next, using the base frame picture of the red synthesized moving picture $R_{HH}$ thus generated, the base frame picture of the green moving picture $G_{HL}$, and the intermediate frame picture of the red moving picture $R_{LH}$, the motion estimating section 108 calculates the motion of each of multiple small rectangular areas in the intermediate frame picture with respect to the base frame picture. At the same time, the motion estimating section 108 generates an intermediate frame picture for the red synthesized moving picture $R_{HH}$ with the raised resolution.

In this example, it will be described how to calculate the motion information within the search ranges of two base frame pictures that respectively precede and succeed the intermediate frame picture of the red moving picture $R_{LH}$ with attention paid to a small rectangular area (surrounded with the bold square) of interest on that intermediate frame picture.

The motion estimating section 108 determines multiple candidate areas that fall within the respective search ranges of those preceding and succeeding base frame pictures with respect to the area of interest (indicated by the bold square) on the intermediate frame picture of the red moving picture $R_{LH}$. Then, the motion estimating section 108 performs the following processing on those candidate areas.

First of all, as indicated by the arrow (2) in FIG. 11, the motion estimating section 108 generates an intermediate frame resolution converted picture by raising the resolution of a red small rectangular area using the green picture of a certain candidate area. The resolution of the red small rectangular area may be raised as is done by the resolution raising section 110 of the second preferred embodiment described above.

Next, as indicated by the arrow (3) in FIG. 11, the motion estimating section 108 calculates the SAD of the luminance values between the resolution converted picture thus generated for the small rectangular area and the candidate area on the base frame picture (i.e., the base frame resolution converted picture) of the red synthesized moving picture $R_{HH}$ and defines the SAD as the degree of similarity between the area of interest and the candidate area.

Subsequently, the motion estimating section 108 repeatedly performs such processing of generating a base frame resolution converted picture corresponding to each small rectangular area falling within the search range and the processing of calculating the degree of similarity between the base frame resolution converted picture and the candidate area with respect to the multiple candidate areas falling within the search range. And the motion estimating section 108 eventually calculates the relative location of the candidate area with the highest degree of similarity (i.e., the smallest SAD) as the motion information V of the small rectangular area of interest.

Then, as indicated by the arrow (4) shown in FIG. 11, the motion estimating section 108 adopts the intermediate frame resolution converted picture, which has been used to calculate the candidate area with the highest degree of similarity, as the small rectangular area of the intermediate frame picture of the synthesized moving picture $R_{HH}$.

The motion estimating section 108 performs these series of operations on each of the three intermediate frame pictures of the red moving picture $R_{LH}$, thereby generating pieces of motion information V for multiple small rectangular areas and also generating intermediate frame pictures for the red synthesized moving picture $R_{HH}$.

By performing these operations, the motion estimating section 108 generates the motion information V and the red synthesized moving picture $R_{HH}$.

If the same series of processing steps as the ones described above are carried out on the blue moving picture $B_{LH}$, too, the blue synthesized moving picture $B_{HH}$ can also be generated.

Optionally, the blue synthesized moving picture $B_{HH}$ may also be generated by performing the following processing. That is to say, the motion estimating section 108 may also calculate the blue synthesized moving picture $B_{HH}$ by Equations (1) through (4), for example, based on the green moving picture $G_{HL}$, the motion information V calculated, and the blue moving picture $B_{LH}$ so that there will be a strong correlation between the high frequency components of the green moving picture $G_{HL}$ and those of the blue synthesized moving picture $B_{HH}$ in accordance with the motion information V.

The motion compensating section 109 receives the motion information V that has been calculated by the motion estimating section 108 and the first color component (i.e., the green moving picture $G_{HL}$) that is stored in the storage section 107, generates a green synthetic picture at an arbitrary timing by motion compensation, and then generates and outputs a green synthesized moving picture $G_{HH}$ with a high frame rate.

The multi-color image synthesizing section 110 receives the data of the green synthesized moving picture $G_{HH}$ that has been generated by the motion compensating section and the data of the red and blue synthesized moving pictures $R_{HH}$ and $B_{HH}$ that have been generated by the motion estimating section 108, and generates and outputs a multi-color moving picture $RGB_{MH}$ consisting of three color components of red, green and blue.

By making its members perform the series of operations described above repeatedly, the multi-color image processing apparatus 3 can generate and output the multi-color moving picture $RGB_{HH}$ continuously.

The multi-color image processing apparatus 3 of this preferred embodiment can not just achieve the effects of its counterpart of the first preferred embodiment but also increase the resolution of the red and blue pictures, representing the second and third color components, in the multi-color moving picture $RGB_{HH}$ generated.

Also, please pay attention to the motion information V that has been generated by the motion estimating section 108. In the first preferred embodiment described above, the motion information V is calculated between a base frame picture and an intermediate frame picture of the red moving picture $R_{LH}$ to find a pair of small rectangular areas with the highest degree of similarity in those pictures. On the other hand, the motion estimating section 108 of this preferred embodiment calculates the motion information V between a base frame picture of the red synthesized moving picture $R_{HH}$ (i.e., a base frame resolution converted picture) and a resolution converted picture of an intermediate frame picture of the red moving picture $R_{LH}$ (i.e., an intermediate frame resolution converted picture) so as to find a pair of small rectangular areas with the highest degree of similarity. The base frame picture of the red synthesized moving picture $R_{HH}$ and the intermediate frame resolution converted picture of the red moving picture $R_{LH}$ should have higher resolutions than the base frame and intermediate frame pictures of the red moving picture $R_{LH}$. That is why the motion information V that has been generated by using pictures with higher resolutions according to this preferred embodiment should be more accurate than the motion information V of the first preferred embodiment described above. And the more accurate the motion information V, the smaller the number of errors in luminance value or location the green synthesized moving picture $G_{HH}$ generated by the motion compensating section 109 would have. As a result, the multi-color image synthesizing apparatus of this preferred embodiment can generate a multi-color moving picture with a higher resolution than the counterpart of the first preferred embodiment described above.

To evaluate a moving picture with a high resolution and a high frame rate that was generated by the multi-color image processing apparatus 3 of this preferred embodiment, the present inventors also carried out experiments to confirm its effects. FIG. 18 shows the results of those experiments that were performed using the multi-color image processing apparatus 3 of this preferred embodiment. The experiments were carried out by the same method and under the same conditions as what has already been described with reference to FIG. 17.

As can be seen from FIG. 18, the PSNRs of the multi-color moving pictures $RGB_{HH}$ generated by the multi-color image processing apparatus 3 of this preferred embodiment (indicated by the bars labeled as "Embodiment 3 of this invention") were higher than those of the pictures generated by bicubic interpolation (indicated by the bars labeled as "Bicubic") or those of the multi-color moving pictures generated by the multi-color image processing apparatus 2 of the second preferred embodiment described above (indicated by the bars labeled as "Embodiment 2 of this invention"). That is to say, the present inventors confirmed that a moving picture with a high resolution and a high frame rate, which was even closer to the original picture, could be generated by using the multi-color image processing apparatus 3 of this preferred embodiment.

The motion information V calculated by the motion estimating section 108 of this preferred embodiment becomes more accurate than the motion information V calculated by the first and second preferred embodiments not just because the red and blue moving pictures $R_{LH}$ and $B_{LH}$ have a low resolution but also because the red and blue moving pictures $R_{LH}$ and $B_{LH}$ have alias components. For example, if moving pictures representing respective color components are shot with a camera that uses the same optical system to do that and if low-resolution red and blue moving pictures $R_{LH}$ and $B_{LH}$ are generated by performing hardware binning processing (which will be described in detail later for a fourth specific preferred embodiment of the present invention) on the imagers, then the red and blue moving pictures $R_{LH}$ and $B_{LH}$ will include alias components. This is because to obtain a green moving picture with a high resolution, the optical system such as lenses is adjusted so as to include more high frequency components but because as for red and blue moving pictures, the processing of averaging the pixel values with a high resolution is carried out. For that reason, the motion information V to be calculated by the motion estimating section 108 of the first and second preferred embodiments based on the incoming red and blue moving pictures $R_{LH}$ and $B_{LH}$ with such alias components will be less accurate compared to a situation where there are no alias components included.

On the other hand, the motion estimating section 108 of this preferred embodiment once generates the base frame resolution converted picture and the intermediate frame resolution converted picture by raising their resolution using the red or blue moving picture and the green moving picture $G_{HL}$ and then calculates the motion information V so that the degree of similarity between these two resolution converted pictures becomes the highest. Even if any alias components were included in the red or blue moving picture, those alias components will be either reduced significantly or eliminated totally in the resolution converted pictures generated. For that reason, too, the motion information V calculated by the method of this preferred embodiment should be accurate. Consequently, the multi-color image synthesizing apparatus of this preferred embodiment can generate a multi-color moving picture with an even higher resolution than the counterpart of the first preferred embodiment described above.

To estimate how much the motion information V generated by the motion estimating section 108 of the multi-color image processing apparatus 3 of this preferred embodiment increased its accuracy, the present inventors carried out experiments to confirm its effects. FIG. 19 shows the results of those experiments that were carried out on the motion information V using the multi-color image processing apparatus 3 of this preferred embodiment.

The experiments were carried out in the following manner. Specifically, a moving picture with a high resolution and a high frame rate, of which the true inter-frame motion had already been known, was provided. Next, a green picture $G_{HL}$ with a high resolution and a low frame rate and red and blue moving pictures $R_{LH}$ and $B_{LH}$ with a low resolution and a high frame rate were generated based on that moving picture and used as incoming pictures. Then, using those incoming pictures, the motion estimating section 108 of the multi-color image processing apparatus 3 of this preferred embodiment calculated the motion information V. And the RMSE (root mean square error) was calculated between the motion information V and the true inter-frame motion as an evaluation value representing the degree of accuracy of motion estimation (as indicated by the ordinate shown in FIG. 19). For the purpose of comparison, the RMSE was also calculated by the motion estimating section 108 of the multi-color image processing apparatus 1 of the first preferred embodiment described above. The resolution and other conditions of experiments were the same as what has already been described for the experiments shown in FIGS. 17 and 18.

As can be seen from FIG. 19, the RMSEs of the motion information V calculated by the motion estimating section of the multi-color image processing apparatus 3 of this preferred embodiment (indicated by the bars labeled as "Embodiment 3 of this invention") were smaller than those of the motion information calculated by the counterpart of the multi-color image processing apparatuses of the first and second preferred embodiments (indicated by the bars labeled as "Embodiments 1 and 2 of this invention"). This means that the multi-color image processing apparatus 3 of this preferred embodiment achieved a higher degree of accuracy of motion estimation.

Such a high degree of accuracy of inter-frame motion estimation, achieved by the motion estimating section 108 of this preferred embodiment, can also be achieved even if the incoming moving pictures do not have mutually different color components. For example, even if the moving picture with a low resolution and a high frame rate and the moving picture with a high resolution and a low frame rate are monochrome moving pictures, a high degree of accuracy of inter-frame motion estimation can also be achieved by generating a base frame resolution converted picture and an intermediate frame resolution converted picture once with raised resolutions and then calculating the motion information so that those two resolution converted pictures will have the highest degree of similarity.

In the foregoing description of the image processing section 106 of this preferred embodiment, the motion estimating section 108 and the motion compensating section 109, which are two major parts of the image processing section 106, are supposed to operate sequentially every five frames. However, those sections do not always have to operate that way. Alternatively, those sections can also operate sequentially on every small rectangular area, or in any other procedure, too.

The processing performed by the motion estimating section 108 and the motion compensating section 109 of this preferred embodiment is represented by the following Equations (5) to (7). The image processing section 106 may adopt any procedure as long as that procedure can be used to solve these mathematical equations:

$$V(x, y, f) = (x, y, f, x+u, y+v, fb) \quad (5)$$
$$(u, v, fb) = \operatorname{argmin}_{(u,v,fb)}(SAD_{x,y,f}(u, v, fb))$$
$$SAD_{x,y,f}(u, v, fb) = \sum_{y'=y-h}^{y+h} \sum_{x'=x-w}^{x+w} \left| \begin{array}{c} IR_{HH}(x', y', f) - \\ IR_{HH}(x' + u, y' + v, fb) \end{array} \right|$$

-continued
$$IR_{HH}(x, y) = (1 + wlr(xl, yl)wh(x, y))IR_{LH}(xl, yl) \quad (6)$$
$$IB_{HH}(x, y) = (1 + wlb(xl, yl)wh(x, y))IB_{LH}(xl, yl)$$

$$wh(x, y) = \frac{IG_{HH}(x, y) - \overline{IG}_{HH}}{\overline{IG}_{HH}}$$

$$\overline{IG}_{HH} = \frac{1}{n}\sum_{y}\sum_{x} IG_{HH}(x, y), (n = 4)$$

$$wlr(xl, yl) = \frac{\sum_{yl}\sum_{xl}(IG_{LH}(xl, yl) - \overline{IG}_{LH})(IR_{LH}(xl, yl) - \overline{IR}_{LH})}{\sqrt{\sum_{yl}\sum_{xl}(IG_{LH}(xl, yl) - \overline{IG}_{LH})^2}\sqrt{\sum_{yl}\sum_{xl}(IR_{LH}(xl, yl) - \overline{IR}_{LH})^2}}$$

$$wlb(xl, yl) = \frac{\sum_{yl}\sum_{xl}(IG_{LH}(xl, yl) - \overline{IG}_{LH})(IB_{LH}(xl, yl) - \overline{IB}_{LH})}{\sqrt{\sum_{yl}\sum_{xl}(IG_{LH}(xl, yl) - \overline{IG}_{LH})^2}\sqrt{\sum_{yl}\sum_{xl}(IR_{LH}(xl, yl) - \overline{IR}_{LH})^2}}$$

$$IG_{LH}(xl, yl) = \frac{1}{n}\sum_{y}\sum_{x} IG_{HH}(x, y), (n = 4)$$

$$\overline{IG}_{LH} = \frac{1}{m}\sum_{yl}\sum_{xl} IG_{LH}(xl, yl),$$

$$\overline{IR}_{LH} = \frac{1}{m}\sum_{yl}\sum_{xl} IR_{LH}(xl, yl),$$

$$\overline{IB}_{LH} = \frac{1}{m}\sum_{yl}\sum_{xl} IB_{LH}(xl, yl), (m = 9)$$

$$IG_{HH}(x, y, f) = \begin{cases} IG_{HL}(x, y, fb) & \text{if } t = fb \\ IG_{HL}(x+u, y+v, fb) & \text{if } t \neq tk \end{cases} \quad (7)$$

In Equations (5), V (x, y, f) represents motion information obtained from a frame f and a location (x, y) and consists of information about a motion to a location (x+u, y+v) in either the preceding or succeeding base frame fb. This motion information V is obtained as motion information (u, v, fb) that minimizes the degree of similarity (SAD) between the base frame resolution converted picture $IR_{HH}$ (x+u, y+v, fb) and the intermediate frame resolution converted picture $IR_{HH}$ (x, y, fb) on the right side of the third equation. Equations (6) are used for calculating the resolution converted pictures $IR_{HH}$ included in Equations (5) and are the same as Equations (3) in this case. Equation (7) is used for calculating $IG_{HH}$ included in Equations (6). Thus, summing these Equations (5) through (7) up, as for the motion information V to calculate, only the motion vector (u, v) becomes an unknown parameter. That is why (u, v) is changed within a predetermined search range and a (u, v) that maximizes the degree of similarity (i.e., minimizes the SAD in Equations (5)) is selected and used as the motion information V.

The processing done by the motion estimating section 108 is represented by Equations (5) through (7) and the one done by the motion compensating section 109 is represented by Equation (7).

Embodiment 4

In the first and second preferred embodiments of the present invention described above, the first, second and third color components are fixed. According to a fourth specific preferred embodiment of the present invention, however, the colors represented by the first, second and third color components are changed according to the status of shooting. In other words, the multi-color image processing apparatus of this preferred embodiment is designed so that when the moving pictures representing the red, green and blue components have their resolutions and frame rates changed according to the status of shooting, the color components processed by the respective sections of the image processing section can also be changed.

FIG. 12 illustrates a configuration for a multi-color image processing apparatus 4 as a fourth specific preferred embodiment of the present invention.

The configuration of the multi-color image processing apparatus 4 is different from those of the multi-color image processing apparatuses 1 and 2 of the first and second preferred embodiments (see FIGS. 1 and 7, respectively) in the following respects.

Firstly, the pictures representing the respective color components, captured by the three imagers 104, can have their resolution controlled. Secondly, the imaging control section 105 includes a resolution control section 112 and a capturing duration control section 113.

The configurations of the other sections and the operations of the respective sections are the same as those of the multi-color image processing apparatus of the first or second preferred embodiment described above.

In this preferred embodiment, however, as the imagers 104 that can change the resolutions of a picture, imagers representing the three color components are supposed to have a resolution of 8,000 horizontal pixels by 4,000 vertical pixels and be able to perform a read operation in a binning mode by adding together the respective pixel values of neighboring 2×2 pixels and reading them altogether. Examples of the binning modes include a hardware binning mode in which the charges of multiple adjacent pixels are added together and the sum is read out and a software binning mode in which those charges are digitized and then added together. In this preferred embodiment, imagers that can perform the hardware binning are supposed to be used. Such imagers that can perform the hardware binning can shorten the time for reading a single picture inversely proportional to the number of pixels to add together. As a result, the resolution of a picture to shoot can be controlled selectively. Using such imagers, the resolution can be selectively switched between 8,000 horizontal pixels×4,000 vertical pixels and 4,000 horizontal pixels×2,000 vertical pixels, for example. In addition, by using such imagers, the frame rate can also be controlled.

In the first through third preferred embodiments described above, a moving picture representing the green component is supposed to be shot with a high resolution and at a low frame rate, while moving pictures representing the red and blue components with a low resolution an at a high frame rate. This is because considering that the human visual system is more sensitive to the color green rather than to the colors red and blue, it is normally preferred that the green synthesized moving picture have a higher subjective image quality than the others.

In this preferred embodiment, the resolution control section 112 calculates the intensities of the respective color components based on the moving pictures representing those color components that have been supplied from the imagers 104 and changes the resolutions according to the intensities of those color components.

More specifically, the resolution control section 112 calculates the resolutions of the pictures that have been shot by the imagers 104 based on the moving pictures representing the respective color components that have been shot by the imagers 104. The capturing duration control section 113 reads and outputs the moving pictures representing the respective color components from the imagers 104 at predetermined time intervals and with predetermined resolutions in accordance with the resolutions of the respective color components that have been calculated by the resolution control section 112.

For example, the average luminance values of the red, green and blue pictures representing the same scene are calculated, one of those three color-component pictures that has the highest average luminance may be used as a picture with a high resolution and a low frame rate, and the other color-component pictures may be read with a low resolution and at a high frame rate.

Thus, if the image to be shot would have a lot of non-green color components (e.g., blue components in a scene where the image should be captured under sea water or in a swimming pool), for example, then the blue moving picture may be shot with a high resolution and at a low frame rate and the red and green moving pictures may be shot with a low resolution and at a high frame rate. Then, a multi-color moving picture with good subjective image quality can be presented to viewers.

As described above, if the resolution control section 112 controls the resolutions of the respective color components to be shot with the imagers 104 according to the intensities of the color components of the subject, then the most intense color component of the subject will have the most raised resolution. As a result, the subjective image quality of the resultant synthesized moving picture can be improved effectively.

Embodiment 5

In the first through fourth preferred embodiments described above, each associated pair of pixels of the moving pictures representing the second and third color components are supposed to have the same spatial arrangement as shown in FIG. 2, for example, and each associated set of pixels in the three moving pictures representing the respective color components is supposed to have the same set of coordinates.

On the other hand, according to this preferred embodiment, each associated pair of pixels in the pictures representing the second and third color components are shifted from each other and a multi-color moving picture is generated using such pictures.

The multi-color image processing apparatus of this preferred embodiment has quite the same configuration as, but is still different in the following respects from, its counterpart 4 of the fourth preferred embodiment shown in FIG. 12.

Firstly, according to this fifth preferred embodiment, the image capturing section 101 obtains pictures representing the second and third color components, of which each associated pair of pixel locations are shifted from each other. Secondly, the image processing section 106 performs its processing with that fact that each associated pair of pixels are presented at different locations on pictures representing the second and third color components in mind. More specifically, because of that difference, the imagers 104 of the image capturing section 101 and the motion estimating section 108 of the image processing section 106 will operate differently from their counterparts of the fourth preferred embodiment. In other words, every section of the multi-color image processing apparatus of this preferred embodiment operates the same way as its counterpart of the apparatus of the fourth preferred embodiment except the imagers 104 and the motion estimating section 108.

Examples of such pictures representing the second and third color components, of which each pair of associated pixel locations are shifted from each other, are shown in FIG. 13. In the example illustrated in FIG. 13, the location of each pixel of a blue moving picture representing the third color component has been translated from that of its associated pixel of a red moving picture representing the second color component by approximately a half pixel both vertically and horizontally alike.

The image capturing section 101 obtains pictures such as the ones shown in FIG. 13 by changing the combinations of pixel locations to add together while the imagers 104 are performing the binning processing. Alternatively, such pictures with shifted pixel locations can also be obtained by changing the positions where the blue imager 104c is arranged, too.

Even if the image processing section 106 performed the same processing as what has already been described for the first through fourth preferred embodiments, the image processing section 106 could still generate a multi-color moving picture by using a blue moving picture with shifted pixel locations and could achieve the same effects as those of the first through fourth preferred embodiments.

According to this preferred embodiment, however, the motion estimating section 108 calculates more accurate motion information V by taking into account such a shift in pixel location between the red and blue moving pictures, thereby generating a multi-color moving picture that has higher image quality after all.

Hereinafter, two different procedures that the motion estimating section 108 can adopt to calculate the motion information V will be described.

Procedure #1

In the first preferred embodiment described above, the motion estimating section 108 calculates the motion between an intermediate frame picture and its preceding and succeeding base frame pictures of a red moving picture $R_{LH}$ (see FIG. 3).

On the other hand, the motion estimating section 108 of this preferred embodiment interpolates and expands the red and blue moving pictures $R_{LH}$ and $B_{LH}$ with shifted pixel locations by bicubic method, and then adds them together and calculates their average, thereby generating a combined red and blue moving picture $RB_{HH}$ with a raised resolution. Thereafter, the motion estimating section 108 calculates the motion between an intermediate frame picture and its preceding and succeeding base frame pictures using the combined moving picture $RB_{HH}$ instead of the red moving picture $R_{LH}$ with a low resolution and then outputs it as the motion information V.

The combined moving picture $RB_{HH}$ will have frequency components that are at most twice as high as those of the red or blue moving picture $R_{LH}$ or $B_{LH}$ both horizontally and vertically alike. That is why compared to calculating the motion using the red moving picture $R_{LH}$, the accuracy of the motion information V should be increased.

Procedure #2

Procedure #1 described above is devised on the fact that a combined moving picture, obtained by adding together two moving pictures with shifted pixel locations, will have higher frequency components than its original moving pictures. On the other hand, the motion estimating section 108 of the third preferred embodiment described above utilizes the fact that a resolution converted picture, obtained by adding high frequency components that have been included in a green moving picture to a red moving picture, will have higher frequency components than its original moving pictures. These two methods use mutually different sources of information, and therefore, could be used in combination.

Thus, the motion estimating section 108 of this preferred embodiment interpolates and expands the red and blue moving pictures $R_{LH}$ and $B_{LH}$ with shifted pixel locations and then adds them together and calculates their average, thereby generating a combined red and blue moving picture $RB_{HH}$ with a raised resolution. After that, the motion estimating section 108 adds the high frequency components that have been included in the green moving picture to the combined moving picture $RB_{HH}$ to obtain a picture, of which the resolution has been further converted.

FIG. 15 illustrates an example of such a combined moving picture $RB_{HH}$ that has been generated by the procedure described above. The motion estimating section 108 interpolates and expands the red and blue moving pictures $R_{LH}$ and $B_{LH}$ with shifted pixel locations so that their resolution of 4,000 pixels×2,000 pixels×30 fps is raised to that of the green moving picture and then adds them together and calculates their average, thereby generating a combined moving picture $RB_{HH}$ with a raised resolution of 8,000 pixels×4,000 pixels×30 fps.

Thereafter, the motion estimating section 108 generates a resolution converted moving picture $RB_{HH}'$ by raising the resolution of the combined moving picture $RB_{HH}$ with the green moving picture $G_{HL}$. Then, the motion estimating section 108 calculates the motion between an intermediate frame picture and its preceding and succeeding base frame pictures based on the resolution converted moving picture $RB_{HH}'$, thereby outputting it as the motion information V.

FIG. 16 illustrates conceptually how the motion estimating section 108 of this preferred embodiment calculates the motion information V. The steps (1) through (4) of this motion information calculating procedure are the same as the ones performed by the motion estimating section 108 of the third preferred embodiment (see FIG. 11). The procedure shown in FIG. 16 is different from the one shown in FIG. 11 only in that the combined moving picture $RB_{HH}$ is used instead of the red moving picture of the third preferred embodiment.

This resolution converted picture $RB_{HH}'$ includes the high frequency components of both the combined moving picture $RB_{HH}$ and the green moving picture $G_{HL}$. That is why the motion information V calculated by using the resolution converted picture $RB_{HH}'$ should be more accurate than the one obtained by Procedure #1 or the third preferred embodiment described above.

After that, the motion compensating section 109 and the other sections will operate in quite the same way as in the fourth preferred embodiment described above.

As described above, according to this fifth preferred embodiment, the image capturing section 101 obtains an image, of which the red and blue moving pictures have shifted pixel locations. Then, by taking advantage of that shift in pixel location between the red and blue moving pictures, the motion estimating section 108 of the image processing section 106 can calculate the motion information V more accurately. With such accurate motion information, a multi-color moving picture of high image quality can be generated eventually.

As described above, by processing the moving pictures representing the respective color components with their pixel locations shifted from each other, the quality of the resultant synthesized moving picture can be improved. This is because if the motion estimating section 108 obtains the motion information based on two pictures with shifted pixel locations, the accuracy of motion estimation can be increased compared to a situation where pictures with non-shifted pixel locations are used. As a result, the synthesized moving picture representing the first color component to be generated by the motion compensating section 109 will have improved image quality, so will the resultant multi-color moving picture. In addition, if the high frequency components included in the green moving picture are added, the accuracy of motion estimation can be further increased. Consequently, the multi-color moving picture can have further improved image quality.

In the foregoing description of preferred embodiments of the present invention, the image capturing section 101 and the image processing section 106 are supposed to be constantly up and running. However, the present invention is in no way limited to those specific preferred embodiments. Optionally, the ON/OFF states of the respective sections may be controlled in response to user's manipulation on buttons. Alternatively, the image capturing section 101 and the image processing section 106 may operate independently of each other. For example, in that case, while an image is being captured, moving pictures representing multiple color components that have been supplied from the image capturing section 101 may be stored in the storage section 107. And when the image shot is going to be presented, the image processing section 106 may generate a multi-color picture. To get these operations done, the storage section 107 is preferably a medium with a huge storage capacity such as a hard disk, an optical disc or a nonvolatile semiconductor memory.

Also, in the foregoing description of preferred embodiments of the present invention, the motion compensating section 109 is supposed to define the pixel values of an arbitrary small rectangular area on an intermediate frame picture of a green synthetic picture by those of a small rectangular area at the corresponding location on a base frame picture of a green moving picture by reference to the motion information that has been calculated by the motion estimating section 108, thereby generating a green synthesized moving picture $G_{HH}$ with a high frame rate.

However, instead of using the pixel values of an associated small rectangular area on a base frame picture as they are, the pixel values of each small rectangular area on the intermediate frame picture may be obtained by computation using a degree of temporal correlation as an evaluation value so that the green synthesized moving picture representing the first color component and the red (or blue) moving picture representing the second (or third) color component will have a high degree of temporal correlation with each other.

For example, as for the green synthesized moving picture $G_{HH}$ generated as a result of the operation of the motion compensating section 109 of the first preferred embodiment and the red moving picture $R_{LH}$, while generating a series of five pictures $G_{HH}(f)$ through $G_{HH}(f+4)$ of the green synthesized moving picture $G_{HH}$, the motion compensating section 109 may multiply two base frame pictures of the green moving picture $G_{HL}$ by a gain so that the average of all pixel values will vary in the same pattern with time between that series of five green pictures $G_{HH}(f)$ through $G_{HH}(f+4)$ and their associated series of five red pictures $R_{LH}(f)$ through $R_{LH}(f+4)$. Alternatively, the pixel values of $G_{HH}(f)$ through $G_{HH}(f+4)$ may be once calculated by the motion compensating section 109 and then modified by being multiplied by gain. The latter processing may be carried out by either the motion compensating section 109 or the resolution raising section 110.

As described above, by increasing the degree of temporal correlation in average luminance between the green synthesized moving picture being generated by the motion compensating section 109 and the red moving picture, the green and red pictures of a multi-color moving picture could still keep the same average luminance variation pattern with time even if the intensity of illumination changed significantly due to the firing of flashlight while a moving picture is being shot, for example.

In the preferred embodiments described above, the multi-color image processing apparatus is supposed to process a moving picture consisting of the three color components of red, green and blue as a most typical example of a multi-color moving picture. However, the number of color components that form one moving picture does not have to be three. Rather the same effect will be achieved as long as a moving picture consists of at least two color components.

Furthermore, in the preferred embodiments described above, the first color component is supposed to be green and the second and third color components are supposed to be red and blue, respectively. However, the present invention is in no way limited to those specific preferred embodiments. Alternatively, any other combination of colors may also be used as long as light is split into at least two components falling within mutually different wavelength ranges. For instance, the first color component may be visible radiation but the second color component may be near-infrared radiation. In that case, a multi-color moving picture, including a moving picture represented by visible radiation as the first color component, can be obtained with the frame rate increased by the image processing section 106.

Also, in each of the preferred embodiments of the present invention described above, the multi-color image processing apparatus is supposed to include the image capturing section 101 and the image processing section 106, each of which is supposed to include multiple sections. However, the image capturing section 101 and the image processing section 106 could be combined together. Or the respective sections of the image capturing section 101 and/or the image processing section 106 could be integrated together in a single IC, for example.

Furthermore, in the preferred embodiments described above, the multi-color image processing apparatus of the present invention is supposed to have the configuration shown in FIG. 1, 7, 10 or 12. For example, the motion estimating section included in each of those configurations is drawn as a functional block. However, any of those functional blocks may be implemented as either a piece of hardware such as a single semiconductor chip or IC (e.g., a digital signal processor (DSP)) or a combination of a computer and a software program (i.e., a computer program).

For instance, FIG. 14 illustrates a hardware configuration for a multi-color image processing apparatus implemented as a computer.

The respective functional blocks of the multi-color image processing apparatus of any of the preferred embodiments of the present invention described above and the hardware components shown in FIG. 14 may have the following correspondence. Take the multi-color image processing apparatus 1 shown in FIG. 1 as an example.

The image capturing section 101 of the multi-color image processing apparatus 1 corresponds to the camera 901 shown in FIG. 14. The storage section 107 thereof may be implemented as either the RAM 906 or the hard disk drive (HDD) 910 shown in FIG. 14. And the functions of the motion estimating section 108, the motion compensating section 109 and the multi-color image synthesizing section 111 are performed by the CPU 904 shown in FIG. 14 by executing the computer program. Likewise, the function of the resolution raising section 110 shown in FIG. 7 is also performed by the CPU 904 shown in FIG. 14 by executing the computer program.

The computer program that operates the computer shown in FIG. 13 may be stored in the ROM 905, for example. The computer program is fetched by the CPU 904 as a processor into the RAM 906 and unfolded there. Then, the CPU 904 executes the respective coded instructions that are the substance of the computer program.

It should be noted that the computer program that represents the function of the motion estimating section 108 could be described in a procedure similar to the flowchart shown in FIG. 5. The computer program may be stored in not just a semiconductor memory such as the ROM 905 but also on an optical disc or a magnetic disk as well. Or the computer program could also be transmitted over a wired or wireless network, broadcast, or downloaded and installed into the RAM 906 of the computer.

Furthermore, in the preferred embodiments described above, the moving pictures representing the respective color components are supposed to be shot by splitting the incoming light into light beams with the respective color components without using a half mirror, for example. That is why compared to the conventional technique that uses a half mirror, the intensity of light does not decrease in any of the moving pictures representing the respective color components. As a result, brighter moving pictures, of which the color components have an increased SNR, can be obtained. Consequently, the resultant multi-color moving picture with a high resolution and a high frame rate to be generated based on those color component pictures should also have increased brightness and an increased SNR.

According to the second preferred embodiment of the present invention described above, a synthetic picture is generated based on a degree of temporal correlation between a synthesized moving picture and a second moving picture so as to increase the degree of their correlation. As a result, a synthesized moving picture can be generated so that there will be a lesser variation with time between pictures representing the first and second color components.

Also, according to the third preferred embodiment of the present invention described above, a second synthesized moving picture is generated with its resolution raised, and therefore, a multi-color moving picture with an even higher resolution can be obtained. In addition, by estimating the motion using a converted moving picture that has been obtained by converting the resolution of the second moving picture, the accuracy of motion estimation should be increased. As a result, a multi-color moving picture with an even higher resolution can be obtained.

INDUSTRIAL APPLICABILITY

A multi-color image processing apparatus and multi-color image capture device according to the present invention can be used effectively as a video receiver/display device or system such as a camera that shoots and transmits or stores a moving picture or a TV set or a video recorder/player that should present a received or previously stored moving picture with its image quality improved. The apparatus or device of the present invention could be used as either an independent image processing apparatus or a device built in a camera or a TV set. Optionally, the present invention could also be implemented and used as a program to run on a computer.

The invention claimed is:

1. An image processing apparatus for generating multi-color moving picture data based on the data of first and second moving pictures, the first moving picture having a first frame rate and being comprised of a number of pictures, each representing a first color component, the second moving picture having a second frame rate, which is higher than the first frame rate, and being comprised of a number of pictures, each representing a second color component that is different from the first color component, resolution of the second moving picture being equal to or lower than that of the first moving picture, wherein the apparatus comprises:

a first image synthesizing section, which generates, based on the data of the first and second moving pictures, a synthesized moving picture corresponding to the first moving picture at a higher frame rate than the first frame rate; and a second image synthesizing section, which receives and synthesizes together the synthesized moving picture and the second moving picture, thereby generating a multi-color moving picture including the first and second color components, and wherein the first image synthesizing section comprises:

a motion estimating section, which receives the data of the second moving picture and which generates motion information based on a change between at least two of the pictures that form the second moving picture; and a motion compensating section for generating a synthetic picture by modifying some of the pictures that form the first moving picture based on the motion information and outputting the synthesized moving picture corresponding to the first moving picture by using the synthetic picture and the first moving picture.

2. The apparatus of claim 1, wherein the first and second moving pictures have their respective base frame pictures, which have been shot at the same time, the second moving picture further having an intermediate frame picture that has been shot between two adjacent base frame pictures thereof, and wherein the motion estimating section generates the motion information based on a change between the intermediate frame picture and the base frame picture of the second moving picture, and wherein the motion compensating section modifies the base frame picture of the first moving picture in accordance with the motion information, thereby generating a synthetic picture corresponding to the intermediate frame of the second moving picture.

3. The apparatus of claim 2, wherein the motion estimating section generates the motion information based on a change between the intermediate frame picture of the second moving picture and a base frame picture thereof that has been shot before the intermediate frame picture.

4. The apparatus of claim 2, wherein the motion estimating section generates the motion information based on a change between the intermediate frame picture of the second moving picture and a base frame picture thereof that has been shot after the intermediate frame picture.

5. The apparatus of claim 2, wherein the motion estimating section generates motion information S based on a change between the intermediate frame picture U of the second moving picture and a base frame picture S thereof that has been shot before the intermediate frame picture, and also generates motion information T based on a change between the intermediate frame picture U of the second moving picture and a base frame picture T thereof that has been shot after the intermediate frame picture, and wherein the motion compensating section modifies the base frame picture S of the first moving picture, corresponding to the base frame picture S of the second moving picture, in accordance with the motion information S, and also modifies the base frame picture T of the first moving picture, corresponding to the base frame picture T of the second moving picture, in accordance with the motion information T, thereby generating a synthetic picture corresponding to the intermediate frame U of the second moving picture.

6. The apparatus of claim 2, wherein the motion estimating section receives the data of the first and second moving pictures, generates not only a base frame resolution converted picture by converting the resolution of the base frame picture of the second moving picture using the base frame picture of the first moving picture but also an intermediate frame resolution converted picture by converting the resolution of the intermediate frame picture of the second moving picture using the base frame picture of the first moving picture, further generates the motion information based on a degree of similarity between the base frame resolution converted picture and the intermediate frame resolution converted picture, and outputs the motion information as the motion information of the second moving picture.

7. The apparatus of claim 6, wherein the motion estimating section generates the converted moving picture by converting the resolution of the second moving picture based on a spatial correlation between associated pictures of the first and second moving pictures.

8. The apparatus of claim 1, wherein the motion estimating section defines multiple areas for each of the at least two pictures, and generates motion information about each said area based on a change in image within that area, and
wherein the motion compensating section defines multiple areas for each of the pictures that form the first moving picture, and modifies each said area in accordance with the motion information, thereby generating a single synthetic picture.

9. The apparatus of claim 1, wherein by using a temporal correlation between the first and second moving pictures as an evaluation value, the motion compensating section generates a synthetic picture corresponding to the first moving picture at an arbitrary timing based on the data of the first and second moving pictures and the motion information.

10. The apparatus of claim 9, wherein by using a temporal correlation between the synthesized moving picture and the second moving picture as an evaluation value, the motion compensating section corrects the pixel values of the synthetic picture included in the synthesized moving picture.

11. The apparatus of claim 1, further comprising a resolution raising section, which receives the data of the synthesized moving picture corresponding to the first moving picture and the data of the second moving picture, and raises the resolution of the second moving picture based on information about pictures that form the synthesized moving picture, thereby generating a synthesized moving picture corresponding to the second moving picture,
wherein the synthesizing section receives the synthesized moving picture corresponding to the second moving picture instead of the second moving picture itself, and synthesizes the respective synthesized moving pictures corresponding to the first and second moving pictures together, thereby generating the multi-color moving picture.

12. The apparatus of claim 11, wherein the resolution raising section raises the resolution of the second moving picture in accordance with information about the pictures that form the synthesized moving picture corresponding to the first moving picture, and uses a spatial correlation between the second moving picture and the synthesized moving picture corresponding to the first moving picture as an evaluation value for generating the synthesized moving picture corresponding to the second moving picture.

13. The apparatus of claim 12, wherein the resolution raising section raises the resolution of the second moving picture in accordance with information about the pictures that form the synthesized moving picture corresponding to the first moving picture, and changes the degrees of correlation between the respective pictures that form the synthesized moving pictures corresponding to the first and second moving pictures according to the degree of correlation between the respective pictures that form the first moving picture and the ones that form the second moving picture.

14. The apparatus of claim 12, wherein the resolution raising section raises the resolution of the second moving picture in accordance with information about the pictures that form the synthesized moving picture corresponding to the first moving picture, and generates pictures to form the synthesized moving picture corresponding to the second moving picture by interpolating and expanding the pictures that form the second moving picture as for an area where there is a low degree of correlation between the respective pictures that form the first moving picture and the ones that form the second moving picture.

15. The apparatus of claim 11, wherein the resolution raising section raises the resolution of the second moving picture in accordance with information about the pictures that form the synthesized moving picture corresponding to the first moving picture, and adds high range components, which are included in the synthesized moving picture corresponding to the first moving picture, to the second moving picture when generating a synthesized moving picture corresponding to the second moving picture.

16. The apparatus of claim 11, wherein the resolution raising section raises the resolution of the second moving picture in accordance with information about the pictures that form the synthesized moving picture corresponding to the first moving picture, and increases the degree of correlation between the synthesized moving picture corresponding to the first moving picture and a synthetic picture corresponding to the second moving picture when generating a synthesized moving picture corresponding to the second moving picture.

17. The apparatus of claim 1, wherein the apparatus is able to generate multi-color moving picture data based on the data of a third moving picture, too, and
the third moving picture having a third frame rate, which is higher than the first frame rate, and being comprised of a number of pictures, each representing a third color component that is different from the first and second color components,
the resolution of the third moving picture being equal to or lower than that of the first moving picture,
wherein the motion estimating section further receives the data of the third moving picture and generates motion information based on a change between at least two of the pictures that form the second moving picture, and
wherein the motion compensating section generates the synthesized moving picture corresponding to the first moving picture based on the motion information about the second and third moving pictures and the data of the first moving picture, and
wherein the synthesizing section receives and synthesizes together the synthesized moving picture and the second and third moving pictures, thereby generating a multi-color moving picture including the first, second and third color components.

18. The apparatus of claim 17, wherein pixels are arranged in spatially different locations between the second and third moving pictures.

19. The apparatus of claim 18, wherein the motion estimating section generates a combined moving picture by calculating a weighted sum of the respective pictures that form the second and third moving pictures with the spatial arrangement of pixels taken into account and also generates the motion information based on a change between at least two of the pictures that form the combined moving picture generated.

20. The apparatus of claim 19, wherein the motion estimating section generates a combined moving picture by calculating a weighted sum of the respective pictures that form the second and third moving pictures with the spatial arrangement of pixels taken into account, also generates a base frame resolution converted picture by converting the resolution of the base frame picture of the combined moving picture using the base frame picture of the first moving picture and an intermediate frame resolution converted picture by converting the resolution of the intermediate frame picture of the combined moving picture using the base frame picture of the first moving picture, and further generates the motion information based on a change between the base frame resolution converted picture and the intermediate frame resolution converted picture.

21. The apparatus of claim 1, wherein the first color component is green.

22. The apparatus of claim 1, further comprising:
a color separating section for splitting light received into at least two light beams that have the first and second color components, respectively; and
an image capturing section for shooting the first and second moving pictures based on the split light beams with the first and second color components, respectively, and
wherein the image capturing section shoots the first moving picture with a resolution that is equal to or higher than the resolution of the second moving picture and at a frame rate that is less than the frame rate of the second moving picture.

23. The apparatus of claim 22, wherein the image capturing section controls the resolutions and the frame rates of the moving pictures representing multiple color components according to the type of the moving picture that has been shot.

24. An image processing method for generating multi-color moving picture data based on the data of first and second moving pictures,
the first moving picture having a first frame rate and being comprised of a number of pictures, each representing a first color component,
the second moving picture having a second frame rate, which is higher than the first frame rate, and being comprised of a number of pictures, each representing a second color component that is different from the first color component,
resolution of the second moving picture being equal to or lower than that of the first moving picture,
wherein the method comprises the steps of:
receiving the data of the second moving picture and generating motion information based on a change between at least two of the pictures that form the second moving picture;
generating, based on the motion information, a synthetic picture by modifying some of the pictures that form the first moving picture and outputting a synthesized moving picture corresponding to the first moving picture at a higher frame rate than the first frame rate by using the synthetic picture and the first moving picture; and
receiving and synthesizing together the synthesized moving picture and the second moving picture, thereby generating a multi-color moving picture including the first and second color components.

25. A computer program embodied in a non-transitory storage medium, that is defined to make a processor, built in an image processing apparatus, generate multi-color moving picture data based on the data of first and second moving pictures,
the first moving picture having a first frame rate and being comprised of a number of pictures, each representing a first color component,
the second moving picture having a second frame rate, which is higher than the first frame rate, and being comprised of a number of pictures, each representing a second color component that is different from the first color component, resolution of the second moving picture being equal to or lower than that of the first moving picture,
wherein the computer program is defined to make the processor perform the steps of: receiving the data of the second moving picture and generating motion information based on a change between at least two of the pictures that form the second moving picture; generating, based on the motion information, a synthetic picture by modifying some of the pictures that form the first moving picture and outputting a synthesized moving picture corresponding to the first moving picture at a higher frame rate than the first frame rate by using the synthetic picture and the first moving picture; and receiving and synthesizing together the synthesized moving picture and the second moving picture, thereby generating a multi-color moving picture including the first and second color components.

26. A non-transitory storage medium having stored thereon the computer program of claim 25.

27. An inter-frame motion estimating method for estimating a motion between associated constituent frames of first and second moving pictures based on the data of the first and second moving pictures,
the first moving picture having a first frame rate and being comprised of a number of pictures,
the second moving picture having a second frame rate, which is higher than the first frame rate, and being also comprised of a number of pictures,
resolution of the second moving picture being equal to or lower than that of the first moving picture,
the first and second moving pictures having their respective base frame pictures, which have been shot at the same time, the second moving picture further having an intermediate frame picture that has been shot between two adjacent base frame pictures thereof, and
wherein the method comprises the steps of:
receiving the data of the first and second moving pictures, and generating a base frame resolution converted picture by converting the resolution of the base frame picture of the second moving picture using the base frame picture of the first moving picture;
generating an intermediate frame resolution converted picture by converting the resolution of the intermediate frame picture of the second moving picture using the base frame picture of the first moving picture; and generating the motion information based on a degree of similarity between the base frame resolution converted picture and the intermediate frame resolution converted picture.

28. The method of claim 27, wherein the first moving picture is comprised of a number of pictures, each representing a first color component, and wherein the second moving picture is comprised of a number of pictures, each representing a second color component that is different from the first color component.

29. An image processing method for generating the data of a synthesized moving picture based on the data of first and second moving pictures, the first moving picture having a first frame rate and being comprised of a number of pictures, the second moving picture having a second frame rate, which is higher than the first frame rate, and being also comprised of a number of pictures, the first and second moving pictures having their respective base frame pictures, which have been shot at the same time, the second moving picture further having an intermediate frame picture that has been shot between two adjacent base frame pictures thereof, and wherein the method comprises the steps of:

receiving the data of the first and second moving pictures, and generating a base frame resolution converted picture by converting resolution of the base frame picture of the second moving picture using the base frame picture of the first moving picture;

generating an intermediate frame resolution converted picture by converting resolution of the intermediate frame picture of the second moving picture using the base frame picture of the first moving picture;

generating the motion information based on a degree of similarity between the base frame resolution converted picture and the intermediate frame resolution converted picture; and generating, based on the data of the first and second moving pictures and the motion information, a synthetic picture by modifying some of the pictures that form the first moving picture and outputting a synthesized moving picture corresponding to the first moving picture at a higher frame rate than the first frame rate by using the first moving picture and the synthetic picture.

\* \* \* \* \*